United States Patent [19]
Ramanan et al.

[11] Patent Number: 5,887,184
[45] Date of Patent: Mar. 23, 1999

[54] METHOD AND APPARATUS FOR PARTITIONING AN INTERCONNECTION MEDIUM IN A PARTITIONED MULTIPROCESSOR COMPUTER SYSTEM

[75] Inventors: Aruna V. Ramanan; Mark Gurevich, both of Poughkeepsie; Leroy R. Lundin, West Hurley; David G. Folsom, Hopewell Junction; Kevin J. Reilly, Kingston; Mark G. Atkins, Clinton Corners; Robert F. Bartfai, West Shokan, all of N.Y.

[73] Assignee: International Business Machines Corporation, Armonk, N.Y.

[21] Appl. No.: 896,186

[22] Filed: Jul. 17, 1997

[51] Int. Cl.⁶ .................................................. G06F 13/00
[52] U.S. Cl. ............................. 395/800.13; 395/800.11; 395/800.12; 395/800.14; 395/800.15; 395/800.18
[58] Field of Search .......................... 395/800.11, 800.13, 395/800.12, 800.14, 800.15, 800.18

[56] References Cited

U.S. PATENT DOCUMENTS

| | | | |
|---|---|---|---|
| 4,761,781 | 8/1988 | Calvignac et al. | 370/352 |
| 5,036,473 | 7/1991 | Butts et al. | 364/489 |
| 5,072,373 | 12/1991 | Dann | 395/200.31 |
| 5,077,483 | 12/1991 | Cloonan et al. | 359/135 |
| 5,189,668 | 2/1993 | Takatori et al. | 371/427 |
| 5,224,100 | 6/1993 | Lee et al. | 370/408 |
| 5,255,369 | 10/1993 | Dana | 395/200.31 |
| 5,260,934 | 11/1993 | Tanaka et al. | 370/395 |
| 5,325,526 | 6/1994 | Cameron et al. | 395/672 |
| 5,357,632 | 10/1994 | Pian et al. | 395/675 |
| 5,453,978 | 9/1995 | Sethu et al. | 370/254 |
| 5,687,309 | 11/1997 | Chen | 395/182.02 |
| 5,781,546 | 7/1998 | Sethu | 371/389 |

OTHER PUBLICATIONS

"Multi–Stage Interconnection Network Topologies for Large Systems" IBM Technical Disclosure Bulletin, vol. 38, No. 10 Oct. 1995, pp. 335–336.

"Partitioning of Packet Switching Networks for Parallel Processors" IBM Technical Disclosure Bulletin, vol. 31, No. 4 Sep. 1988, pp. 20–22.

"Programmable Interconnection Switch Structure for Large Scale Machine Prototyping" IBM Technical Disclosure Bulletin, vol. 35, No. 1A, Jun. 1992, pp. 396–399.

"Scalable, Modular, Interconnection Cache Network Structure for Temporarily Localized Communication Requests" IBM Technical Disclosure Bulletin, vol. 34, No. 10A, Mar. 1992, pp. 66–68.

*Primary Examiner*—Larry D. Donaghue
*Assistant Examiner*—Dzung C. Nguyen
*Attorney, Agent, or Firm*—Marc A. Ehrlich

[57] ABSTRACT

A method, associated apparatus and program product for partitioning a plurality of interconnection elements among disjoint partitions of processors in a computer system so as to interconnect the processors within each of the disjoint partitions, and to isolate the processors in each interconnected partition from processors in the other partitions. The interconnection elements may be arranged into groups including node coupling elements and link coupling elements and in larger systems may include intermediate groups having intermediate coupling elements. The partitioning of the interconnection elements begins with the interconnection of processors in the largest disjoint partition and proceeds by connecting the successive largest processor partitions whose interconnection elements share a group with the interconnect elements used for the previously interconnected processor partitions until no such interconnect elements on shared groups remain, subsequently the process is repeated until all processors in the disjoint partitions are interconnected.

21 Claims, 22 Drawing Sheets

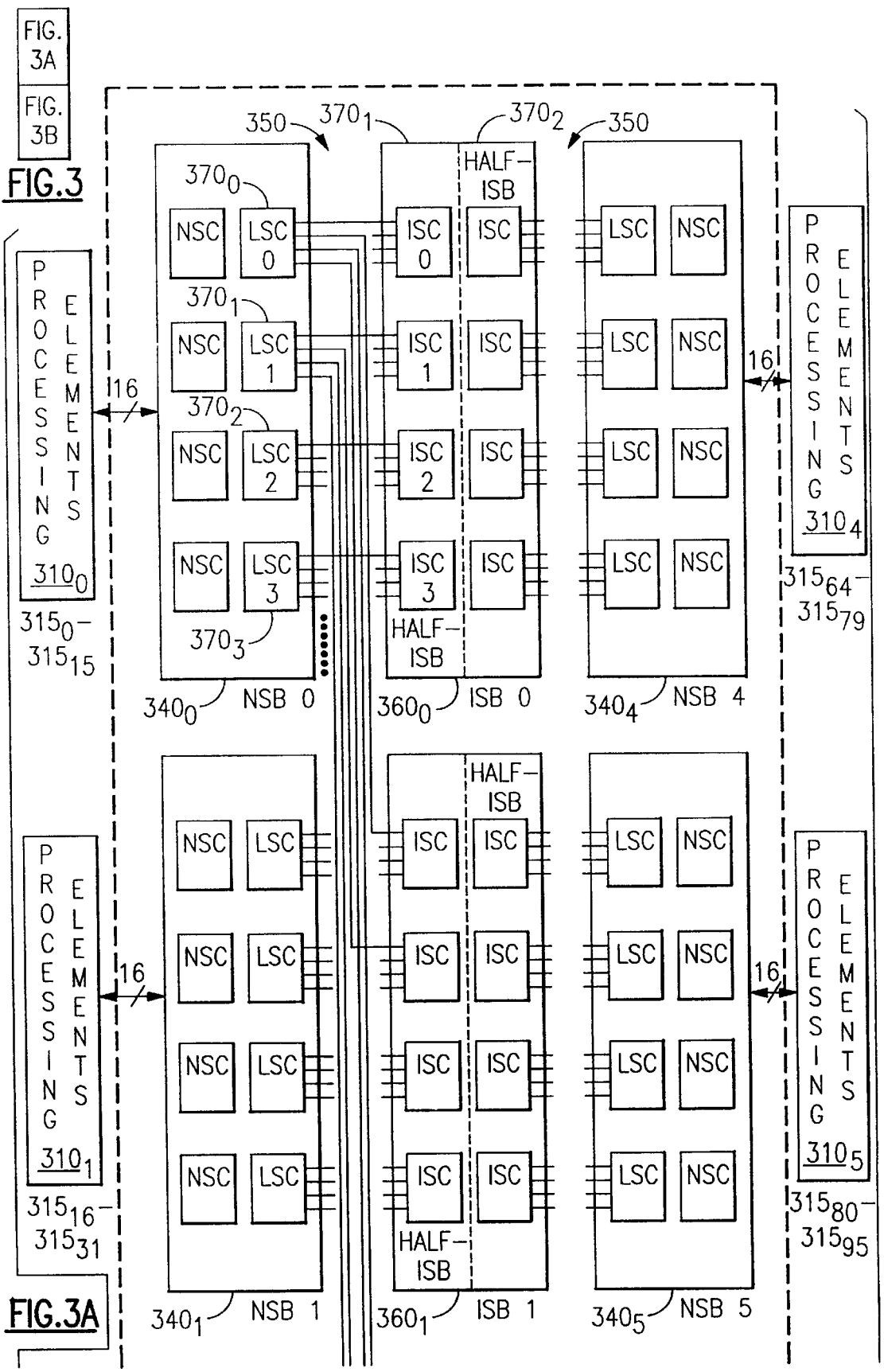

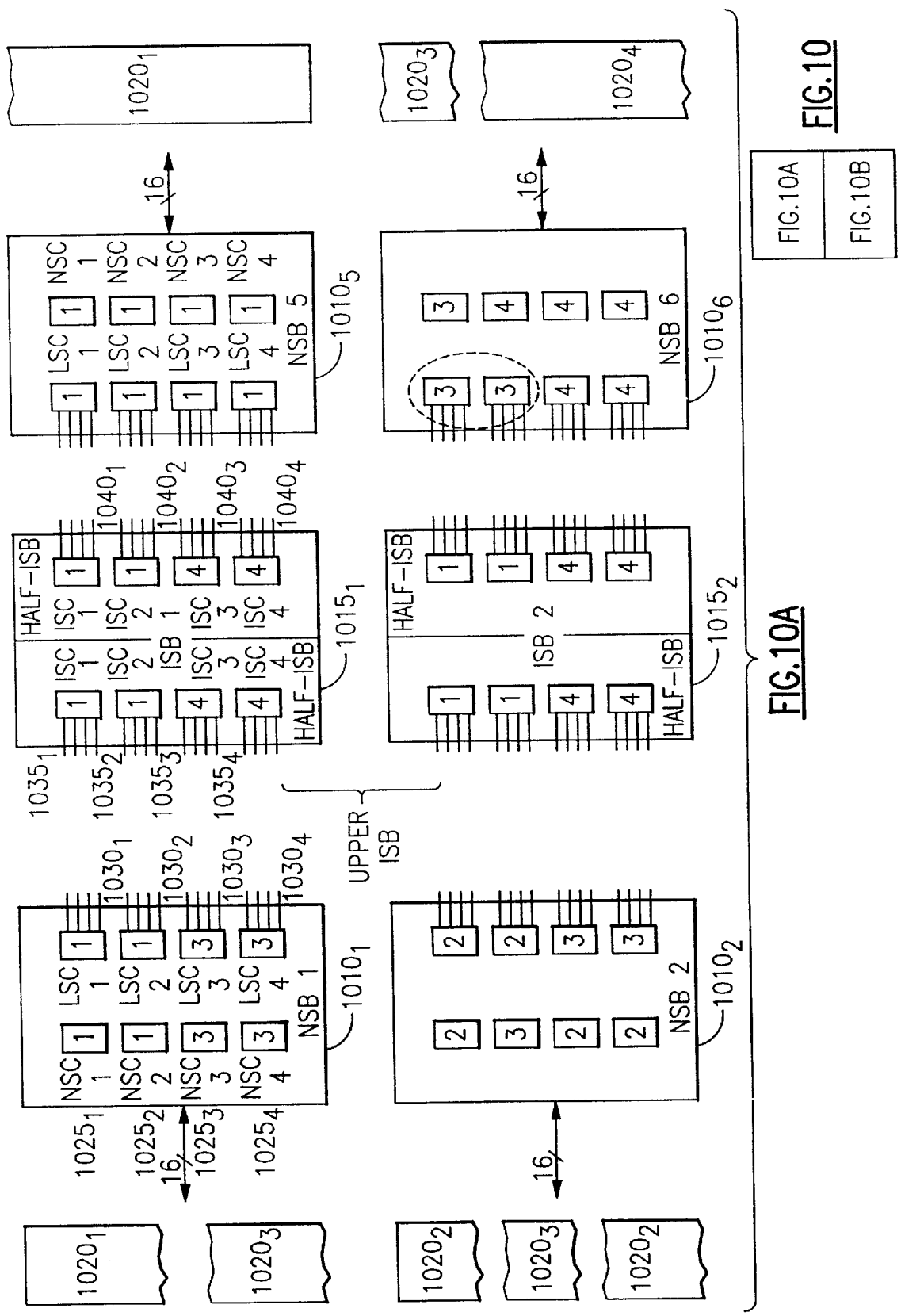

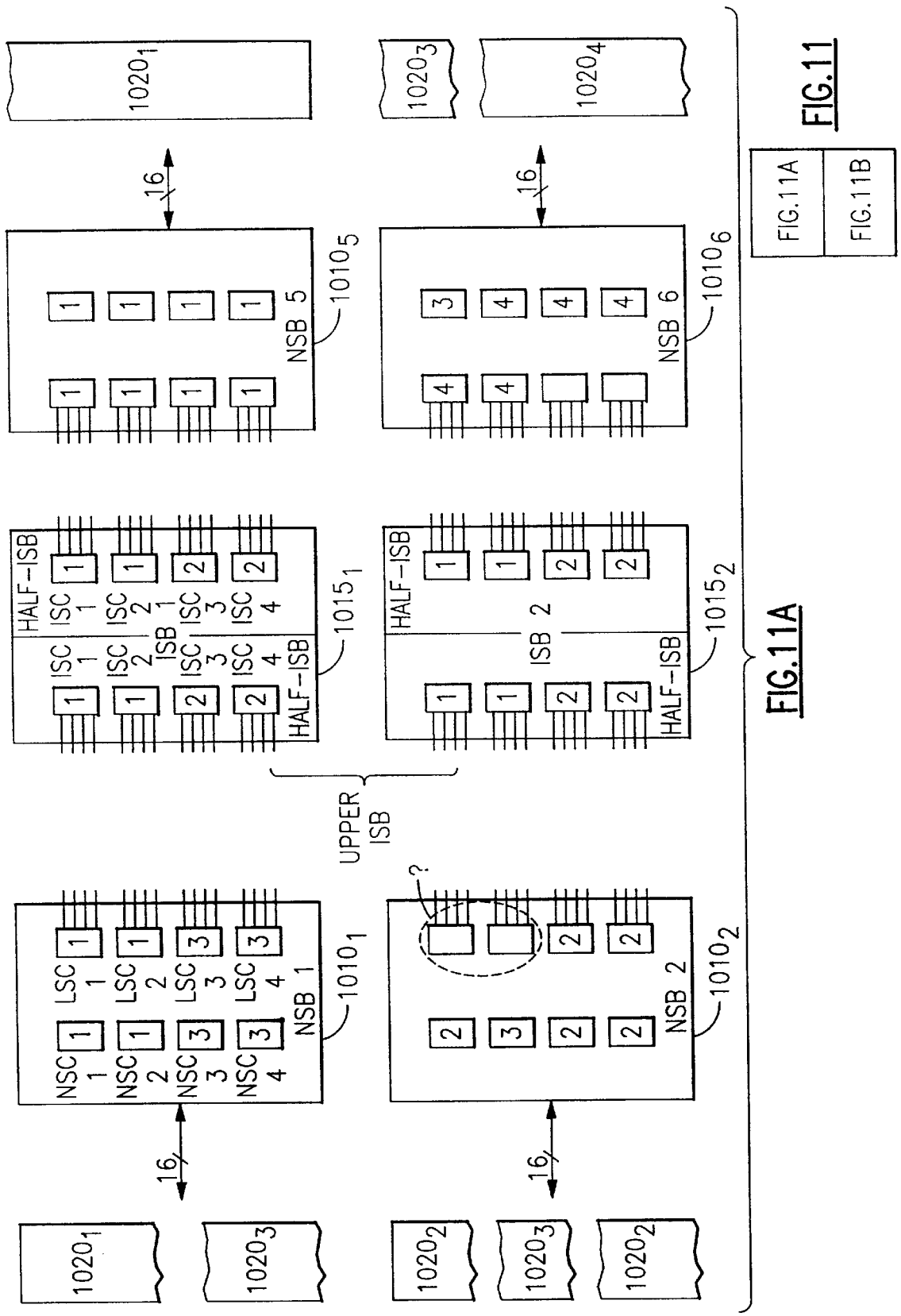

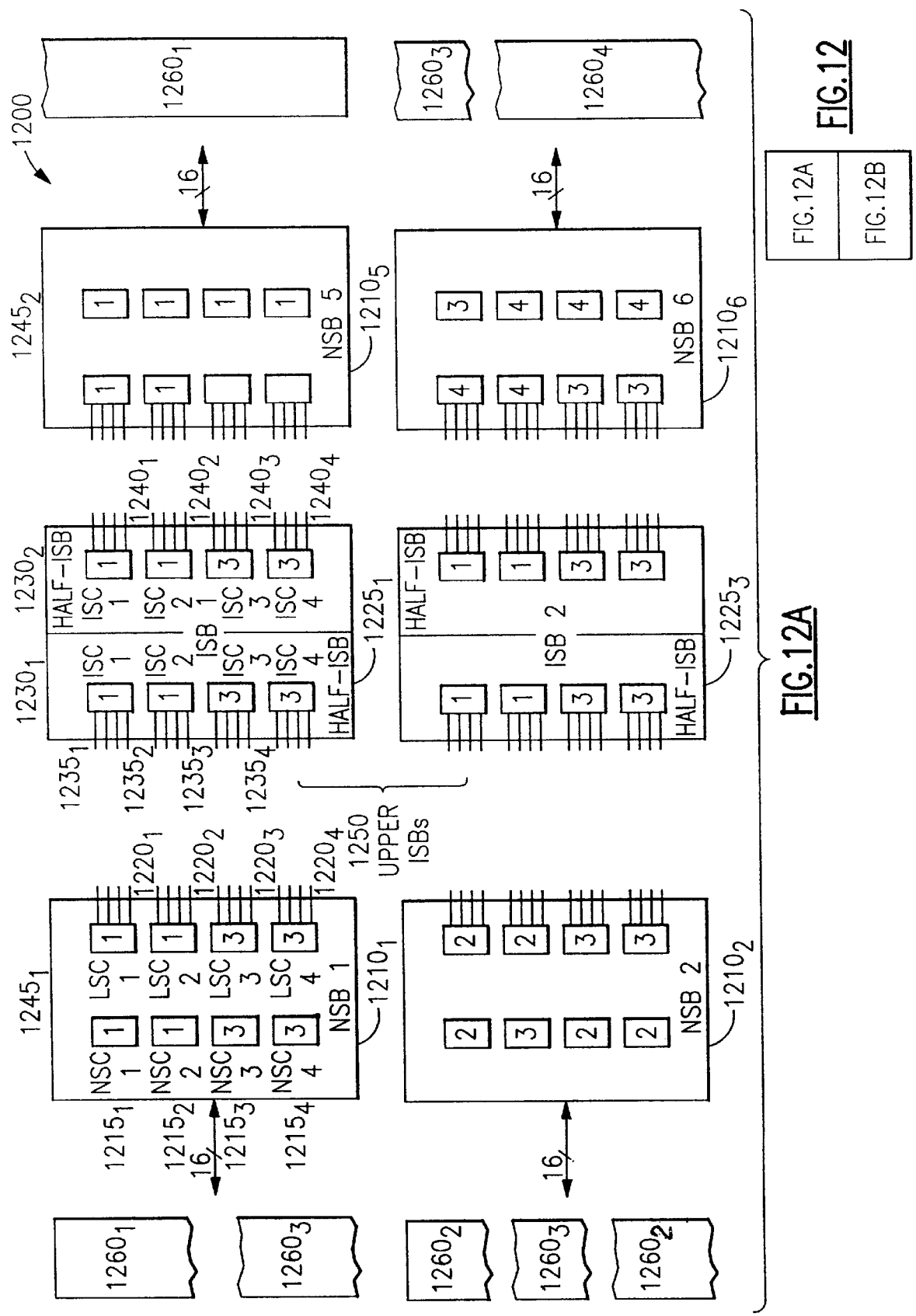

METHOD AND APPARATUS FOR PARTITIONING AN INTERCONNECTION MEDIUM IN A PARTITIONED MULTIPROCESSOR COMPUTER SYSTEM

FIELD OF THE INVENTION

The present invention generally relates to the design and implementation of partitioned shared resource systems such as multiprocessing systems or networks having a shared communications fabric, and particularly to an apparatus and associated method for optimizing the partitioning of these systems by allocating partitions of a switching fabric comprising the communications network of the multiprocessor system to each of a plurality of system partitions. Without loss of generality, the invention is particularly suited for incorporation within a high speed packet based switching network within a massively parallel processing system.

BACKGROUND OF THE INVENTION

Parallel computer systems have proven to be an expedient solution for achieving greatly increased processing speeds heretofore beyond the capabilities of conventional computational architectures. With the advent of massively parallel processing machines such as the IBM RS/6000 SP1 and the IBM RS/6000 SP2, volumes of data may be efficiently managed and complex computations may be rapidly performed. (IBM and RS/6000 are registered trademarks of International Business Machines Corporation, Old Orchard Road, Armonk, N.Y., the assignee of the present application).

A typical massively parallel processing system may include a relatively large number, often in the hundreds or even thousands of separate, though relatively simple, microprocessor-based nodes which are interconnected via a communications fabric comprising a high speed packet switch network. Messages, in the form of packets are routed over the network between the nodes enabling communication therebetween. The nodes typically comprise a microprocessor and associated support circuitry such as random access memory (RAM), read only memory (ROM), and input/output I/O circuitry which may further include a communications subsystem having an interface for enabling the node to communicate through the network.

Among the wide variety of available forms of packet networks currently available, perhaps the most traditional architecture implements a multi-stage interconnected arrangement of relatively small cross point switches, with each switch typically being an N-port bi-directional router where N is usually either 4 or 8 and with each of the N ports internally interconnected via a cross point matrix. For our purposes herein, we will consider the switch to be an 8 port router switch. In such a network, each switch in one stage, beginning at one side (so-called input side) of the network is interconnected through a unique path (typically a byte-wide physical connection) to a switch in the next succeeding stage, and so forth until the last stage is reached at an opposite side (so called output side) of the network. The bi-directional router switch included in this network is generally available as a single integrated circuit (i.e. a "switch chip") which is operationally non-blocking, and accordingly a popular design choice. Such a switch chip is described in the U.S. patent application having Ser. No. 08/424,824, now U.S. Pat. No. 5,546,391, entitled "A Central Shared Queue Based Time Multiplexed Packet Switch With Deadlock Avoidance" by P. Hochschild et al. filed Mar. 4, 1996, (still pending and commonly assigned to the present assignee hereof).

A switching network typically comprises a number of these switch chips organized into two interconnected stages, for example: a four switch chip input stage followed by a four switch chip output stage, all of the eight switch chips being included on a single switch board. With such an arrangement, messages passing between any two ports on different switch chips in the input stage would first be routed through the switch chip in the input stage that contains the source or input port, to any of the four switches comprising the output stage and subsequently, through the switch chip in the output stage the message would be routed back (i.e. the message packet would reverse its direction) to the switch chip in the input stage including the destination (output) port for the message. Alternatively, in larger systems comprising a plurality of such switch boards, messages may be routed from a processing node, through a switch chip in the input stage of the switch board to a switch chip in the output stage of the switch board and from the output stage switch chip to another interconnected switch board (and thereon to a switch chip in the input stage). Within an exemplary switch board, switch chips that are directly linked to nodes are termed node switch chips (NSCs) and those which are connected directly to other switch boards are termed link switch chips (LSCs). Inter-switch chip routing is typically pre-defined during system initialization and rarely ever altered thereafter.

Switch boards of the type described above may simply interconnect a plurality of nodes, or alternatively, in larger systems, a plurality of interconnected switch boards may have their input stages connected to nodes and their output stages connected to other switch boards, these are termed node switch boards (NSBs). Even more complex switching networks may comprise intermediate stage switch boards which are interposed between and interconnect a plurality of NSBs. These intermediate switch boards (ISBs) serve as a conduit for routing message packets between nodes coupled to switches in a first and a second NSB. For purposes of the ensuing discussion, the switch chips located on these ISBs will be termed intermediate switch chips (ISCs).

In massively parallel processing systems, it is a popular implementation choice to partition the processing nodes of the system so as to establish multiple smaller parallel processing systems within the massively parallel processing system. Disjoint sets of the processing nodes of the massively parallel system are located exclusively within one of the plurality of smaller system partitions and cannot share communication paths with the sets of nodes residing in other system partitions.

The U.S. patent application having Ser. No. 08/664,990 entitled "System Partitioning for Massively Parallel Processors" by Brenner et al. (still pending and commonly assigned to the present assignee) as well as the pending, cross-referenced U.S. patent applications having Ser. Nos. 08/664,577 entitled "Method and Apparatus for Creating Persistent Isolated Sub-Environments in a Massively Parallel Processing System", 08/664,580 entitled "An Apparatus and Method for Creating Isolated Sub-Environments Using Host Names and Aliases", and 08/664,689 entitled "Use Of Daemons in a Partitioned Massively Parallel Processing System Environment" all by Brenner et al. and all commonly assigned to the present assignee, are directed toward creating node-based system partitions in a massively parallel processing system, and while they are not directed toward providing a method and apparatus for efficiently allocating the switching fabric of the massively parallel processing system among the system partitions, they do provide an excellent background for the present invention, and as such, are incorporated herein by reference.

Partitioning of multinode systems provides the user with the ability to completely isolate computing environments within the parallel processing system from one another. This ability to carve out isolated smaller partitions of processors from a larger processing system has proven advantageous for a variety of system implementations. For example, a test environment for a new beta-level version of an operating system may be run on the same system, but in a system partition which is completely isolated from a production environment operating system operating on a different system partition. Moreover, in designing optimized computing environments within a single partitioned parallel processing system, the cross-over of packet traffic from a first partition to the switches of a second partition may degrade the performance of the computing environment associated with the shared switches. For example, a plurality of processing nodes in the massively parallel processing system may be used for processing a parallel data base system, while the remaining nodes are used to process another, time critical, parallel processing application. While the massively parallel processing system can accommodate the concurrent execution of both of these jobs, each job that is executed competes for a limited set of node and switch resource. In a switching fabric of a massively parallel processing system utilizing a high performance switch it is possible for one job to monopolize the switch resource and thereby degrade the performance of the other job. Accordingly, to ensure optimal performance for concurrently operating computing environments within a single parallel processing system, disjoint partitioning of the switching resource among the disjoint system partitions must be implemented in a manner which ensures that each system partition makes the most efficient use of its allocated switching resource.

Massively parallel processing machines have previously been implemented so as to provide the user with a predefined static set of partition configurations incorporating many constraints. For example, in the case of the RS/6000 SP2, prior to the present invention, a maximum of only three partitions were permitted and the smallest partition would typically be set at all processing nodes connecting to a single NSB. The switch resource partitioning and allocation techniques presented herein advantageously free a system administrator to implement customized partitions within a parallel processing system which may not be included within the previously provided static configuration set, as well as providing system optimization capabilities.

From the foregoing it is clear that in order to accommodate a flexible partitioning of parallel processing systems, the switch network must likewise be capable of being flexibly partitioned among the system partitions to provide communication links between nodes within the same partition while ensuring that communication paths between nodes in different partitions do not intersect. Since a number of physical constraints exist for allocating resources on the switch network to system partitions, implementation of this partitioned switching network creates resource allocation problems which increase in complexity as the number of nodes in the system increases.

A number of generally applicable resource partitioning schemes have been implemented in computer systems. For example, U.S. Pat. No. 5,036,473 entitled "Method For Using Electronically Reconfigurable Logic Circuits" by Butts et al. describes a hierarchical partitioning scheme for a reconfigurable interconnection of logic chips. The system is designed to be partitioned into multiple clusters in accordance with a partitioning hierarchy which assigns design primitives to a box, board and logic chip, while satisfying system constraints. The hierarchical partitioning methodology initially places all primitives into a null cluster, and proceeds to form clusters by selecting a seed primitive from the null cluster and by moving primitives having the highest advantage function (a function that is specific to this implementation) into a cluster until it is full. This partitioning method is focused upon satisfying very specific system constraints, and proceeds by assigning the smallest logical levels of the system to build clusters which ultimately define the partitioned structure of the system. The partitioning method is a logic partitioning method rather than a solution for allocating switching resource among disjoint processing node partitions. Moreover, while the disclosed methodology for building logic partitions on a logic element-by-logic element basis is well suited for the logic design described in Butts et al., it would prove error-laden and time consuming in other partitioned systems. For example, in systems in accordance with the focus of the present invention in which sets of disjoint nodes have been previously partitioned and wherein it is desired to optimize switch partitioning to allocate disjoint sets of switches to each node partition, an element-by-element method for the creation of switch partitions would require numerous attempts before achieving a workable albeit less than optimal switch partition allocation.

An article entitled Programmable Interconnection Switch Structure for Large Scale Machine Prototyping, published in The IBM Technical Disclosure Bulletin (TDB) Vol. 35, No. 1A June 1992 describes a method and system for providing a prototype environment for large scale digital system design. The article proposes the use of "soft-chips" such as field programmable gate arrays (FPGAs) to create a prototype system partitioned into "islands" of logic function used to create connections to switch chips. Signals traversing a switch chip from a logic source to a destination require one input pin and one or more output pin on the chip. Multiple routes may be stored and implemented over the shared connection resource on a time shared basis. A switch chip in this system may participate in any number of routes and is not constrained as in typical partitioned parallel processing systems to exclusive use within a single partition. Accordingly, the TDB does not offer a scheme for creating disjoint partitions as is required in a partitioned massively parallel processing system.

In a more recent TDB article entitled Multi-Stage Interconnection Network Topologies for Large Systems (IBM TDB Vol. 38 No. 10 October 1995), topologies for systems having 129–512 nodes are presented. The TDB discusses the inclusion of NSBs and ISBs of the type previously described, and a method for connecting them in 256 and 512 way systems, however it does not address the issue of partitioning the switching network to allocate switches among system partitions.

It is apparent from the foregoing that a mechanism for managing resource allocation by partitioning a switch network so as to accommodate disjoint partitions of processing nodes in a partitioned parallel processing system would prove useful to a system administrator attempting to manage a partitioned multinode system. Moreover, a need exists for such a mechanism in which implementation of the switch partitioning and allocation is balanced, optimal and satisfies a wide range of system partition configurations. These requirements as well as other advantageous features are addressed by the present invention.

SUMMARY OF THE INVENTION

The foregoing problems and shortcomings of the background art are addressed, and further advantageous features are provided by the present invention in which an associated method, apparatus and program product for providing disjoint partitioning and allocation of the elements of an interconnection medium among disjoint partitions of nodes in a partitioned multinode system is taught. The invention is particularly, though not exclusively, suited for incorporation within a high speed packet switch network of a massively parallel processing system.

A first embodiment of the invention is directed toward the partitioning of an interconnection medium for a data processing system wherein the interconnection medium includes interconnection elements such as node coupling elements which are connected to nodes within disjoint sets of nodes and link coupling elements for interconnecting the node coupling elements. The interconnection medium is partitioned to dedicate separate sets of these interconnection elements to each of the disjoint sets of nodes, so as to permit the nodes within each disjoint set to be connected together, while concurrently isolating all of the interconnected nodes within a given one of the disjoint sets from the nodes in all others of the disjoint sets.

The interconnection medium is organized into groups each including node and link coupling elements. In a preferred embodiment, each group may be chosen to be a separate switch board including node switch chips and link switch chips thereon. The node coupling elements may connect within the groups to link coupling elements so as to interconnect node coupling elements within the group, and the link coupling elements may connect to other link coupling elements within other groups to permit the interconnection of node coupling elements in different groups. The assignment of the interconnection elements to interconnect the nodes within a given disjoint set of nodes creates an interconnection partition, wherein each of the interconnection elements may only be assigned to a single disjoint node set and as such may only be included within a single partition. Any of the groups of interconnection elements may include therein interconnection elements which have been assigned to one of the disjoint node sets and other interconnection elements which have been assigned to another one of the disjoint node sets.

Creation of the interconnection element partitions begins by selecting the largest set of disjoint nodes to be interconnected and assigning the interconnection elements required to interconnect the nodes therein to a first interconnection partition if the interconnection medium includes enough of the interconnection elements to accomplish the desired interconnection.

Upon creation of the interconnection partition it is thereafter determined whether any groups in the interconnection medium include node coupling elements which have been assigned to the created interconnection partition as well as other node coupling elements which have yet to be assigned.

The largest one of the non-interconnected disjoint node sets which is connected to node coupling elements which share their group with other node coupling elements which have been previously assigned to the interconnection partition, is next interconnected by assigning the required number of interconnection elements to another interconnection partition, if they are available in the interconnection medium and have not been previously assigned to the previous partitions. This step is repeated until no non-interconnected disjoint node set is coupled to node coupling elements which shares a group with other node coupling elements assigned to a completed interconnection partition. Thereafter, it is determined whether any of the disjoint node sets has yet to be internally interconnected, and the process is repeated from the beginning until all of the nodes within each of the disjoint node sets have been internally interconnected.

In another embodiment, comprising a larger number of nodes arranged into disjoint node sets, the interconnection medium further includes intermediate coupling elements arranged into intermediate groups, which may preferably correspond to the physical arrangement of intermediate switch chips on an intermediate switch boards. The intermediate coupling elements serve to interconnect link coupling elements residing in different groups. The interconnection medium is further organized into two stages of groups with a stage of intermediate groups interposed therebetween.

Creation of the interconnect partitions in this embodiment begins by assigning the requisite interconnection elements to connect the largest one of the disjoint node sets thereby creating a first interconnection partition.

Next the largest non-interconnected disjoint node set which is coupled to a node coupling element which shares a group, in both of the stages of groups, with node coupling elements in an already created partition, is selected and the interconnection elements required to connect together the nodes therein. If available, are assigned to another interconnection partition. This step is repeated until none of the non-interconnected disjoint node sets satisfies this condition.

Next is determined whether any of the disjoint sets of nodes has yet to be internally interconnected. If so, the assignment repeats from the beginning until the nodes within each of the disjoint node sets have all been internally interconnected.

Further embodiments of the invention include a methodology for creating partitions in large multinode systems having intermediate coupling elements wherein some or all of the interconnection partitions include interconnection elements in only one of the two stages.

Other embodiments teach inventive techniques for assessing which of the groups, intermediate groups and which interconnection elements therein should be assigned to each of the interconnection partitions to ensure optimal communication between the nodes, as well as efficiently determining that a particular set of disjoint node sets may not be interconnected by a given interconnection medium.

In a preferred embodiment of the invention, the aforementioned exemplary techniques may be incorporated into a computer program, which when provided with information on the interconnection medium and the disjoint nodes sets to be interconnected, as input, will generate a topology file including data to be used to partition the communications backplane of a massively parallel processing computer system.

BRIEF DESCRIPTION OF THE DRAWINGS

The subject matter which is regarded as the invention is particularly pointed out and distinctly claimed at the conclusion of the specification. The foregoing as well as other features and advantages of the invention will be apparent from the following detailed description in conjunction with the accompanying drawings, in which:

FIGS. 3A and 3B taken together, illustrates a relatively large massively parallel processing system having 128 nodes interconnected by eight node switch boards and four intermediate switch boards;

FIGS. 10A and 10B taken together, illustrates a failed attempt to manually partition the switching resource in a 128 node parallel processing system having eight node switch boards interconnected by four intermediate switch boards and having four node partitions, into four corresponding switch partition objects;

FIGS. 11A and 11B Illustrate a second failed attempt to manually partition the switching resource in a 128 node parallel processing system having eight node switch boards interconnected by four intermediate switch boards and having four node partitions, into four corresponding switch partition objects;

FIGS. 12A and 12B Depict a successful partitioning of the switching resource in the illustrated 128 node parallel processing system via implementation of the herein described inventive techniques;

DETAILED DESCRIPTION OF THE PREFERRED EMBODIMENTS OF THE INVENTION

Those skilled in the art readily recognize that the partitioning of packet networks having bi-directional, multi-stage, interconnected, cross-point packet switches to allocate the limited switching resources among the nodes of disjoint system partitions of a partitioned computing system, regardless of the specific application thereof, creates a complex resource allocation problem. Accordingly, after considering the following description, those individuals will readily recognize that the teachings of the present invention can be easily and cost-effectively incorporated into nearly any such packet network to optimally and efficiently allocate the switching resource therein. Thus, the present invention will prove useful to designers and administrators of packet networks of essentially any size and design for use across a broad range of switch network implementations, including without limitation, digital communications, such as public or private telephone, or other similar networks, or in specialized applications such as the communications backbone of a massively parallel processing system. In order to present an easily comprehensible description, however, we shall limit our discussion of the present invention to the context of its implementation within a massively parallel processing computer system, and in particular, within the high performance communications network of the IBM RS/6000 SP (Scalable POWERParallel) family of scalable parallel processing systems currently manufactured by IBM (which additionally owns the trademark Scalable POWERParallel).

In order to enhance the reader's understanding, we will first introduce the various aspects of message passing in a parallel processing system, and specifically we will address the organization of the bi-directional cross-point based packet switch network utilized therein. We will thereafter proceed to illustrate a typical node partitioning situation, and subsequently describe, in detail, the present invention which advantageously optimizes switch partitioning for allocation among disjoint node partitions within such a system.

Figure 1:
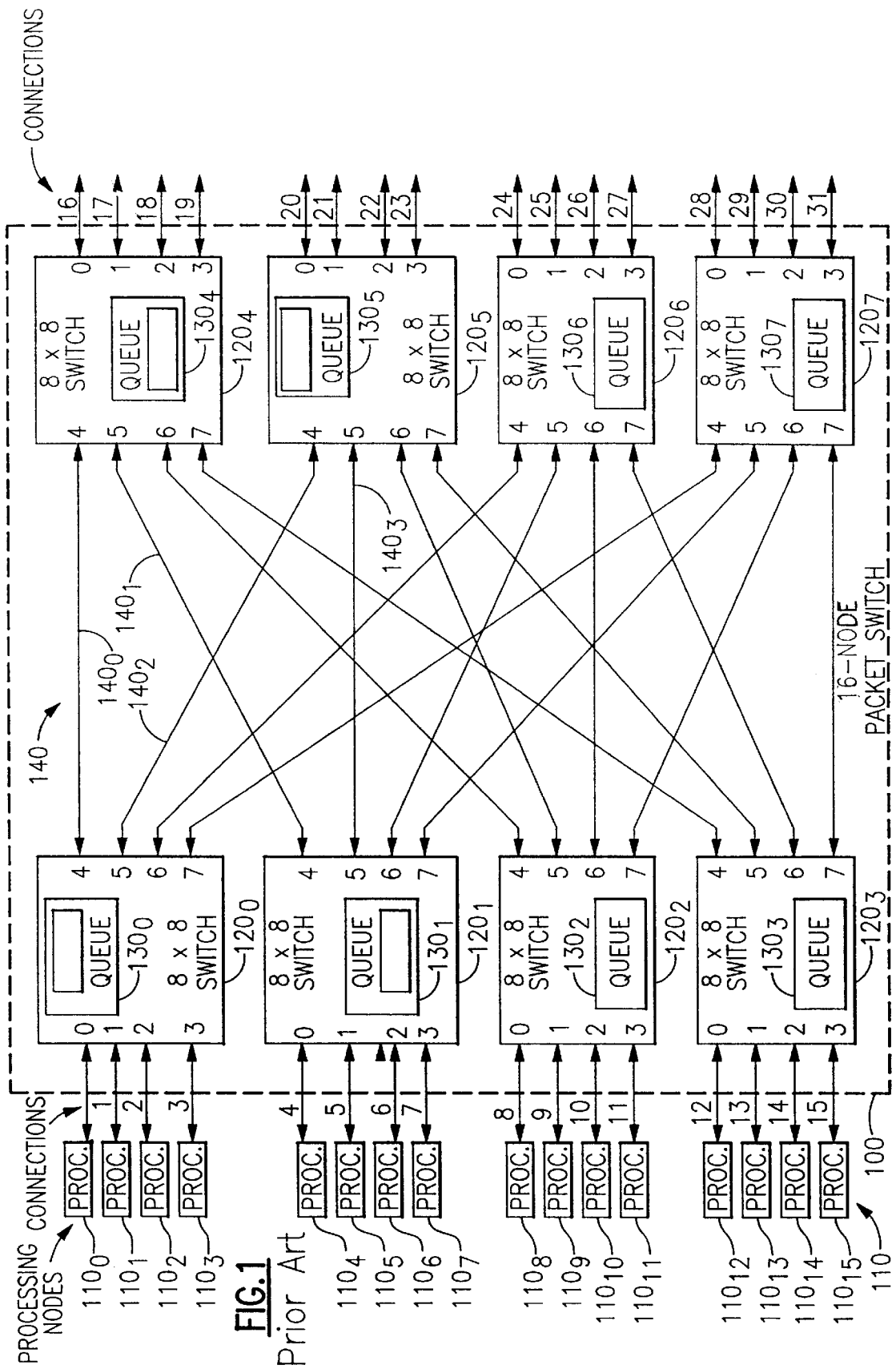
FIG. 1 Depicts a simple 16 node parallel processing system interconnected by a switch board comprising eight switch chips.

We will initially consider a conventional parallel processing system as illustrated in FIG. 1. This system contains a 16 node packet switch 100 (which is also commonly referred to as a "packet network" or simply "network" or a "switch fabric") to which 16 separate, though essentially identical processing elements 110 (specifically processing elements $110_0$, $110_1$, $110_{15}$) are connected to each of the 16 node connections, correspondingly numbered 0 to 15 provided by this network. The remaining 16 connections, specifically connections 16–31 may be connected to other similar systems or may be left unattached, however these connection points are not typically connected to an additional 16 processing elements so as to avoid deadlocks. Each element constitutes a processing node (or simply a node) of the system. The processing elements themselves are each microprocessor-based, typically including an RS/6000 microprocessor manufactured by IBM Corporation. Since the present invention is directed toward the partitioning of the network, rather than focusing upon the specific architecture or circuitry of any of the processing elements, these aspects, which will be readily apparent to those skilled in the art, will not be discussed in any detail herein.

As shown in FIG. 1, the network is configured using eight separate 8 by 8 bi-directional switch circuits 120 organized into two interconnected stages: an "input" stage consisting four switch circuits $120_0$, $120_1$, $120_2$, and $120_3$ and an "output" stage consisting of four switch circuits $120_4$, $120_5$, $120_6$, and $120_7$. The designations "input" and "output" stages are purely arbitrary, to facilitate this discussion, in actuality, any stage or port on the network may serve as either an input or output stage or port, Each of the switch circuits is preferably a central queue based non-blocking 8-way router, in particular as described in the U.S. patent application having Ser. No. 08/424,824 entitled "A Central Queue Based Time Multiplexed Packet Switch With Deadlock Avoidance" by P. Hochschild et al., filed Mar. 4, 1996, which is commonly assigned to the present assignee and incorporated herein by reference. Since each switch circuit is advantageously integrated as a single integrated circuit, i.e., a so-called "chip" we will, for purposes of clarity, refer to the circuit itself as a switch chip. Of course, those of ordinary skill in the art will readily appreciate that each switch circuit need not be integrated onto the switch chip, however, inasmuch as the switch chip itself does not encompass the present invention, it will not be addressed in any detail with reader being directed to the aforementioned Hochschild et al. application for all further details on this circuit.

As depicted, each of the switch chips contains a central queue, illustratively queues $130_0$, $130_1$, $130_2$, ..., $130_7$ situated within corresponding switch circuits $120_0$, ..., $120_7$. For purposes of the present discussion, the central queue serves to provide an alternate route through the corresponding switch circuit to, inter-alia, ameliorate input blockage and deadlocks which are caused when the buffers in the input ports become filled with opposing message traffic.

The input and output stages of the network are interconnected through connection matrix 140, with each of these connections being essentially a byte-wise physical link, of which illustrative links $140_0$, $140_1$, $140_2$, and $140_3$ are specifically numbered. Through this matrix, a port on each one of the switch chips in the input stage is separately and physically connected to a corresponding port on every one of the switch chips in the output stage. For example, switch chip $120_0$, which provides ports 0–7, is connected through ports 4, 5, 6 and 7, via corresponding links, to port 4 on each of switch chips $120_4$, $120_5$, $120_6$ and $120_7$ all in the output stage. The packet network, comprising the eight switch chips together with connection matrix 140, collectively comprise a single switch board 100. Ports 0–3 of each switch chip are connected to links external to the switch board; while ports 4–7 of each such chip are connected to links within connection matrix 140 and hence, therethrough, to a port of another switch chip within the same switch board.

In order for processing elements to communicate with each other, such as for one element to request data from another element or to supply data thereto, a "source" processing element, based upon an application portion it is executing, fabricates a packet containing an appropriate message, including instructions and/or data, which is transmitted into the packet switch 100 for its ultimate transport to a "destination" processing element. The destination element subsequently processes the received data and/or instructions and produces an appropriate response, which in turn, based upon the application portion executing at the destination processing element, is fabricated into another packet and (for example) transported through the packet network 100 to either the source element or a different processing element for further processing.

Figure 2:
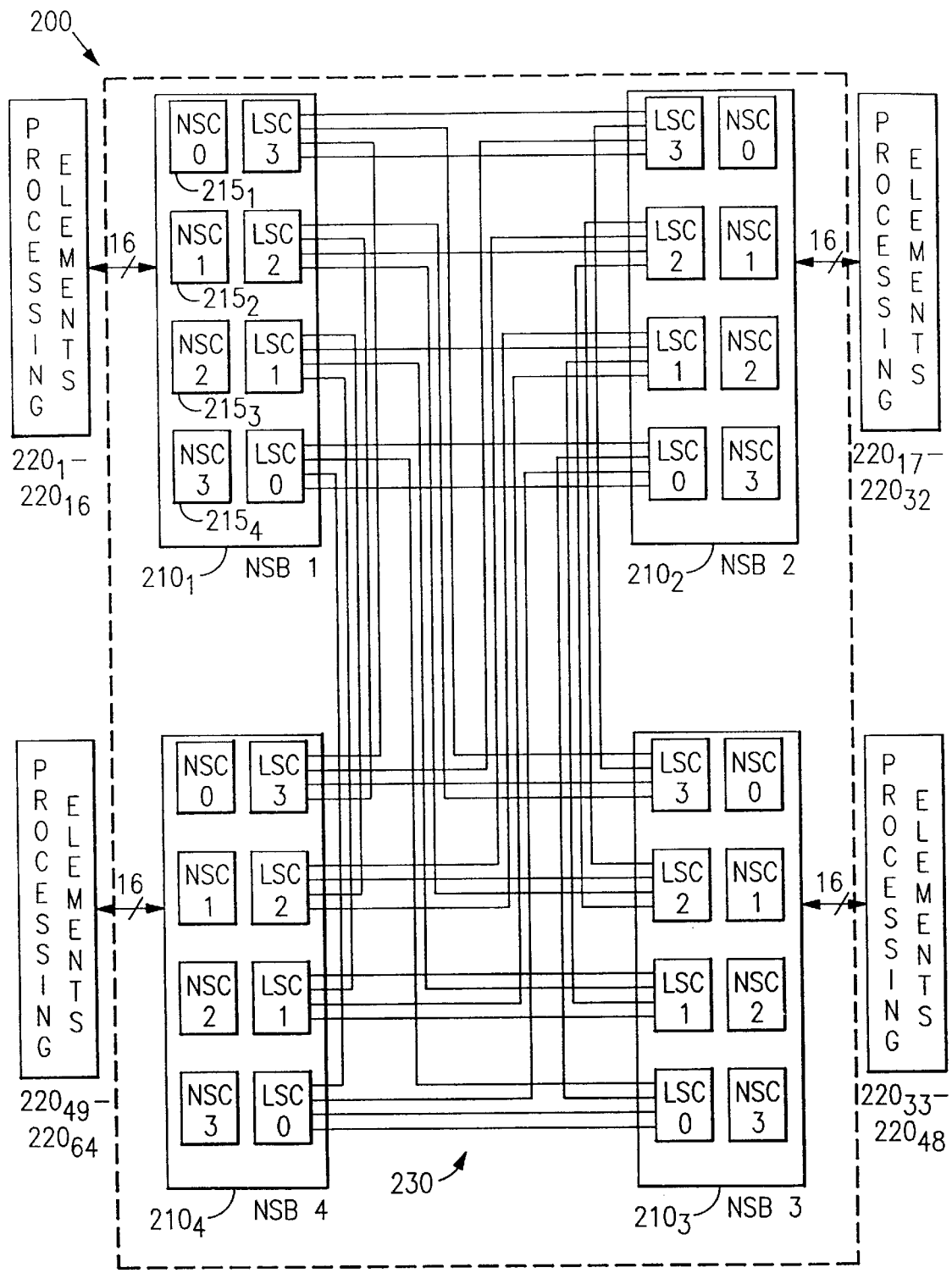
FIG. 2 Depicts a 64 node parallel processing system wherein four interconnected switch boards interconnect the processing elements.

In somewhat larger parallel processing system such as a system 200 including 64 nodes, a number of switch boards 100 may be interconnected to provide the necessary interprocessor connections. Turning now to FIG. 2, an exemplary 64 node parallel processing system 200 is depicted, wherein four switch boards $210_1$–$210_4$, which are substantially identical to the switch board 100 described with reference to FIG. 1, are inter-connected, and in turn, provide communication links, collectively designated as 230 between the four sets of sixteen processing elements, specifically processing elements $220_1$–$220_{64}$ connected to the switch boards.

In each exemplary switch board 210, it can be seen that a first stage of four switch chips which we shall term node switch chips (NSCs) serve to interconnect the switch board to the associated sixteen processing elements, with four processing elements being connected to each NSC. Thus, for example, for switch board $210_1$, NSC 0–NSC 3 $215_1$–$215_4$ provide connections to processing elements $220_1$–$220_{16}$. Likewise, a second stage of switch chips, which shall be labelled link switch chips (LSCs) provide a connection to the other three switch boards via communication links 230, with each of the four LSCs connecting at least once to each of the other three switch boards and twice to one of the three switch boards. Thus, for example, in switch board $210_1$ LSC 3 connects once to an associated LSC 3 on each of switch boards $210_3$ and $210_4$ and twice to an associated LSC 3 on switch board $210_2$.

In accordance with the foregoing description it is readily apparent that a physical limitation exists with respect to the number of NSBs (of the type generally described with reference to FIG. 1) that can be directly physically interconnected. Since each NSB includes 4 LSCs each having four ports for connecting to other NSBs, it follows that each LSC may connect to four other NSBs for a total of 5 NSBs in a system in which the NSBs are directly physically interconnected. Accordingly, direct connection of NSBs may support up to an 80 processing element parallel processing system (i.e. 5 NSBs * 16 processing nodes/NSB =80 processing nodes).

Figure 3B:
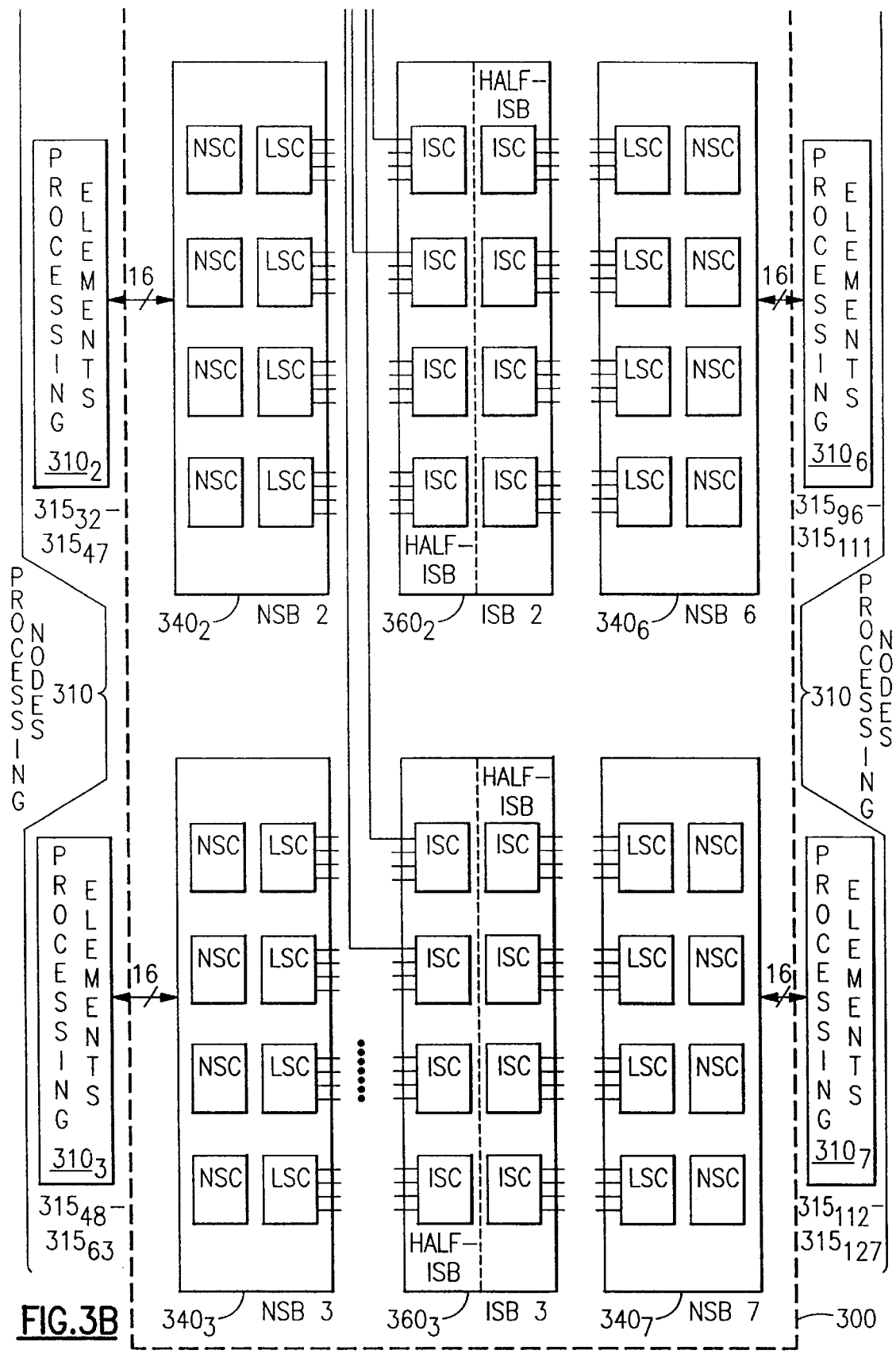

To provide the necessary inter-processor routing capability in a larger massively parallel processing system, such as one utilizing 128 separate processing elements, the system uses a plurality of switch boards each identical to the above described switch board 200, and organized into interconnected stages of switch boards: node switch boards (NSBs), in a first stage for connecting to individual processing elements (or nodes), and intermediate switch boards (ISBs), in another stage, for interconnecting the NSBs. A 128 processor system may employ as many as 12 separate switch boards with 8 such switch boards dedicated as NSBs and the remaining 4 switch boards dedicated as ISBs. Each of the NSBs provides 16 ports to connect to 16 different processing elements and another 16 ports to interconnect to a port on each of the 4 ISBs. With this arrangement, the NSBs route packets from and to individual processing elements connected thereto and the ISBs route packets between different NSBs, to interconnect processing elements connected to different NSBs An exemplary 128 node system 300 is illustrated in FIG. 3 which comprises FIG. 3A and FIG. 3B taken together. This system 300 provides 128 different processing elements $315_0$, ..., $315_{15}$, ..., $315_{112}$, ..., $315_{127}$, collectively depicted as processing nodes 310, and organized, from a physical standpoint, into 8 racks of 16 processing elements each, specifically processing racks $310_0$, ..., $310_7$. Each of these racks is, in turn, connected to sixteen ports of a respective NSB. System 300 contains 8 NSBs designated $340_0$ through $340_7$ also referred to herein as NSB 0, NSB 1, ..., NSB 7. The remaining sixteen ports of each NSB are interconnected through individual links in connection matrix 350 (partially illustrated for sake of clarity in FIGS. 3A and 3B), to a corresponding port on each one of sixteen ports on each one of the four ISBs 360, specifically ISBs $360_0$, $360_1$, $360_2$, and $360_3$ also referred to herein as ISB 0, ISB 1, ISB 2, and ISB 3. The eight intermediate switch chips (ISCs) on the ISBs interconnect LSCs on the NSBs on opposite sides of the system from one another. By way of example, consider NSB 0, as can be seen in the exemplary illustration, a link from every one of the four LSCs $370_0$–$370_3$ or correspondingly LSC 0–LSC 3 thereon goes to one of the four ISCs, and each LSC connects once to a corresponding ISC on each of the four ISBs. For example LSC 0 on NSB 0 connects to ISC 0 on ISB 0, ISB 1, ISB 2 and ISB 3. Thus, NSB 0 $340_0$ can route a message to each of the four ISBs (ISB 0–ISB 3). The other NSBs are interconnected, (although not shown in the figure) to every one of the ISBs.

For ease of understanding FIG. 3 presents the eight NSBs as a being divided into two stages with each stage connected to corresponding half-ISBs 370. A half-ISB is the set of four ISCs on an ISB not directly connected to one another. For example, referring to FIG. 3 ISC 0–ISC 3 ($380_0$–$380_3$) on ISB 0 ($360_0$) constitute a first half-ISB $370_1$ and ISC 4–ISC 7 ($380_4$–$380_7$) thereon constitute a second half-ISB $370_2$. Stage one includes NSB 0–NSB 3 and stage two includes NSB 4–NSB 7. The LSCs within the NSBs of stage one connect to the first half-ISB of ISB 0–ISB 3 and likewise the NSBs of stage two connect to the second half-ISB of ISB 0–ISB 3.

With the foregoing general description of various implementations of parallel processing systems serving as our background we turn now to discuss the partitioning of these systems. As previously noted, the practice of partitioning multiprocessor systems and in particular the partitioning of an IBM RS/6000 SP massively parallel processing system into separate node-based system partitions is known to those skilled in the art. Node partitioning criterion varies with the intent behind the partitioning, such that different system partitions including different sets of nodes may result from a system partitioning scheme that serves to simultaneously accommodate a production and test environment than would result from a partitioning scheme seeking to optimize the performance (for example by eliminating cross-over packet traffic) of two separate production environments. A general overview of node selection in the IBM RS/6000 SP which provides insight into node selection for partitioned systems is provided in the White Paper entitled "Node Selection for the IBM RS/6000 SP System, Factors to Consider" by Clive Harris, IBM EMEA RS/6000 Consultant, last edited November 1996 (the White Paper). The White Paper is currently available on the RS/6000 site on the world wide web at the universal resource locator (URL) listed as: http://www.RS6000.ibm.com/resource/technology/sp_papers/spnodes.html. Since the details of node selection for system partitioning are not necessary for a thorough understanding of the present invention, the reader is directed to the aforementioned White Paper and other associated publications for more detail regarding the selection and partitioning of nodes in a partitioned parallel processing system.

For purposes of the present invention it is sufficient to understand that a massively parallel processing system may be partitioned so as to include a plurality of disjoint system partitions wherein not only are nodes in different system partitions isolated from one another, but wherein each of these system partitions additionally do not share any of the switching resource with each other. Stated another way, all of the nodes which link to a given switch chip must belong to the same system partition. Accordingly, each system partition is assigned a so-called switch partition object. The switch partition object comprises the set of switch chips that are assigned to the nodes belonging to the same system partition.

In allocating switch partition objects among the disjoint system partitions, the objective is to provide the maximum possible connectivity between nodes within a system partition, while isolating different system partitions from one another. As we shall subsequently describe in detail, a classification system of the switch partition objects as well as a set of switch partitioning rules are requisite in order to implement an orderly and optimal allocation of switching resource among the system partitions. The focus for the remainder of the present discussion will therefore be directed to the partitioning of the processing nodes and the switch fabric of the previously described parallel processing systems.

Figure 4:
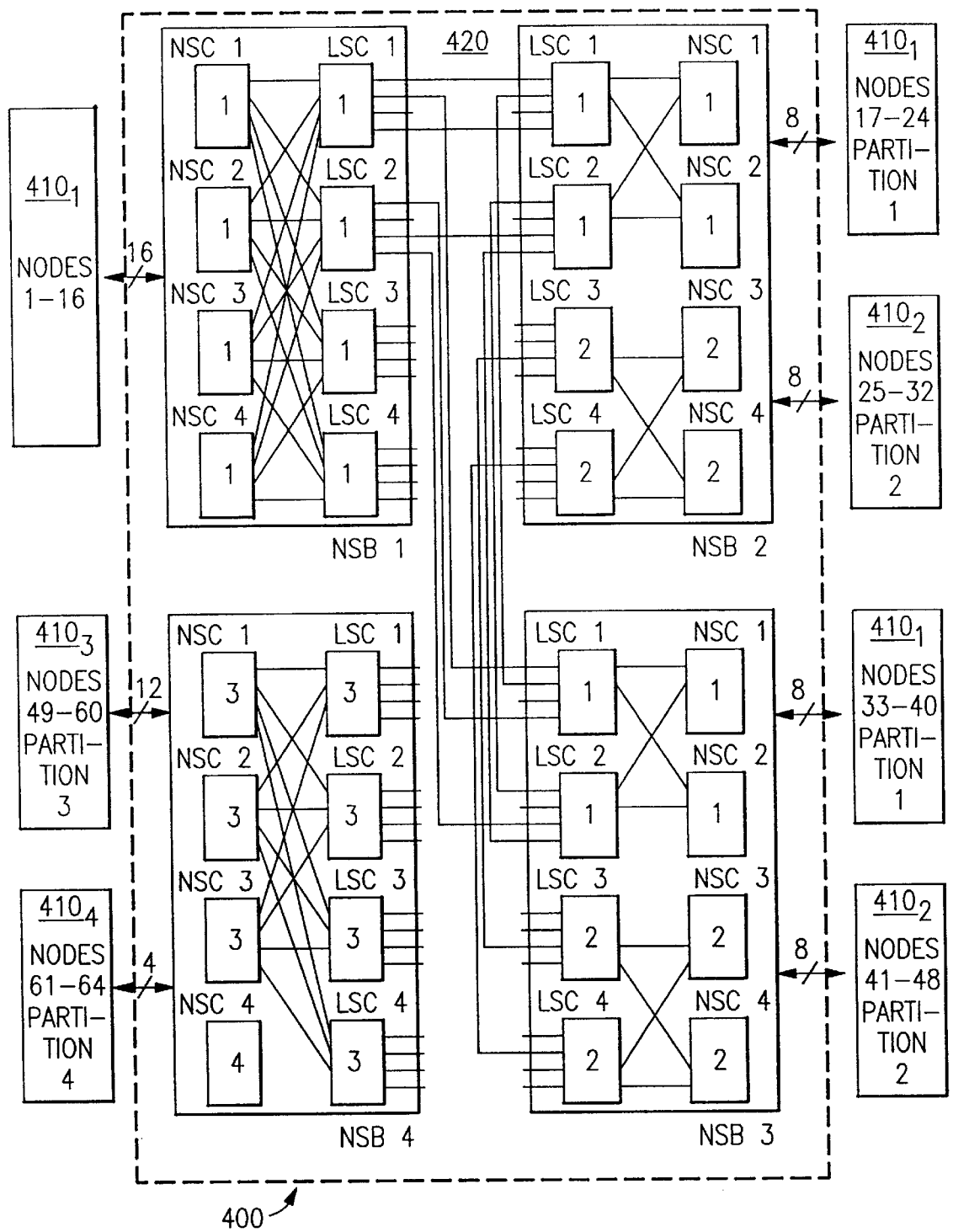
FIG. 4 Illustrates the exemplary 64 node parallel processing system with four system (node) partitions and the accompanying switch partition objects.

We will now consider a partitioned parallel processing system based upon the 64 node system 200 described with reference to FIG. 2. FIG. 4 illustrates the exemplary 64 node system 400 having four system partitions $410_1$–$410_4$ or correspondingly partitions 1–4. The four system partitions each comprise a disjoint set of processing nodes. For example, partition 1 comprises processing nodes 1–16, as well as nodes 17–24 and nodes 33–40. Partition 2 comprises nodes 25–32 and nodes 41–48 Partition 3 consists of nodes 49–60 and partition 4 includes nodes 61–64. Via a visual inspection of the node partitions, it will be apparent that partition 1 may be connected to NSB 1, NSB 2 and NSB 3 as follows: nodes 1–16 are coupled to the NSCs 1–4 on NSB 1, nodes 17–24 are coupled to the NSC 1 and NSC 2 on NSB 2 and nodes 33–40 are coupled to NSC 1 and NSC 2 on NSB 3. For partition 2, nodes 25–32 are coupled to NSC 3 and NSC 4 on NSB 2 and nodes 41–48 are coupled to NSC 3 and NSC 4 on NSB 3. Finally nodes 49–60 for partition 3 are coupled to NSC 1–NSC 3 on NSB 4 and node 61–64 for partition 4 is coupled to NSC 4 on NSB 4.

As we have previously indicated, an important aspect of the partitioning scheme is that nodes in the disjoint partitions do not share any switching resource so as to avoid degraded performance due to cross-over packet traffic between partitions. With the foregoing switch partition allocation among the disjoint system partitions 1–4, it can be seen that no NSC is allocated to more than a single partition so that the NSCs in system 400 satisfy the aforementioned partition scheme. In order to prevent cross-over packet traffic for the partitioned system 400 we must further ensure that none of the LSCs include inter-partition connections. By comparing the LSC connections for the partitioned 64 node parallel processing system 400 of FIG. 4 against the non-partitioned 64 node parallel processing system 200 of FIG. 2 it can be seen that only the intra-partition connections between LSCs remain. In particular, by referring to the connection matrix 420 of FIG. 4 it can be seen that LSCs 1–4 of NSB 1 connect only to LSC 1 and LSC 2 of NSB 2 and to LSC 1 and LSC 2 of NSB 3, and that LSC 1 and LSC 2 of NSB 2 only connect to LSCs 1 and 2 on NSB 1 and to LSC 1 and LSC 2 on NSB 3 and finally that LSC 1 and LSC 2 on NSB 3 only connect to LSCs 1 and 2 on NSB 1 and to LSC 1 and LSC 2 on NSB 2. Each of these sets of connections represents a connection within partition 1 and accordingly the combination of NSC and LSC connections for partition 1 defines the switch partition object for partition 1. Likewise, LSC 3 and LSC 4 on NSB 2 connects only to LSC 3 and LSC 4 on NSB 3 and vice versa. These are the only LSC connections for partition 2 and in combination with the NSC connections designated for partition 2 they define the switch partition object for partition 2.

Partition 3 is entirely contained within LSCs 1–4 on NSB 4 and partition 4 consists only of NSC 4 on NSB 4. As such there are no LSC to LSC (inter-NSB) connections required to interconnect each of the processing nodes comprising partition 3 or partition 4. By reference to FIG. 4 it can be seen that no part of the connection matrix 420 connects to NSB 4. Accordingly, the NSC 1–NSC 3 and LSC 1–LSC 4 included on NSB 4 constitute the switch partition object for partition 3. Moreover, since partition 4 consists only of nodes connected to NSC 4 (nodes 61–64) on NSB 4, their interconnection requires no LSCS at all. Accordingly, NSC 4 on NSB 4 defines the switch partition object for partition 4.

Inspection of the resulting switch partitions in the foregoing example reveals a classification scheme including three types of partitions. Partition 1 and partition 2 are examples of what will be termed "multi-board" (or alternatively inter-NSB) partitions, as they incorporate a plurality of NSBs. Partition 3 illustrates an example of what we will call a "single-board" (or alternatively intra-NSB) partition as it incorporates a plurality of switch chips on a single NSB. Finally, partition 4 exemplifies a partition which is classified as a "single chip" partition, since only one switch chip from one NSB is included therein.

For purposes of ensuring reliable inter—NSB communications for multi-board partitions, it is required within our exemplary parallel processing system, that each NSC participating in either a single-board or a multi-board partition is connected to at least two LSCs on its associated NSB. This requirement ensures that the bandwidth from each participating NSC is maintained at a reasonable level and provides alternate paths to the communication matrix 420 or to the NSCs on the same NSB in the event that one of the connected LSCs should fail. Consequently, we can state that a given NSB may only be part of either one or two single-board or multi-board partitions.

In examining the communication links 230 for the parallel processing system 200 as illustrated in FIG. 2 it can be observed that, as a general rule, like-numbered LSCs on different NSBs have connecting links. In other words, LSC 1 on NSB 1 will have physical communication lines available for use which connect it to LSC 1 on each of NSB 2, NSB 3 and NSB 4. Accordingly, and in order to ensure proper connectivity in a partitioned system, we will further require that the at least two LSCs chosen for an NSC on an NSB which is part of a multi-board partition, correspond to the at least 2 LSCs chosen for the NSC's on different NSBs within the same multi-board partition. For example, by reference to FIG. 4 we can see that within the switch partition object allocated to partition 2, LSC 3 and 4 for NSB 2 are used to interconnect LSC 3 and LSC 4 on NSB 3 and vice versa.

The foregoing example, illustrates a relatively straightforward switch partitioning implementation for a smaller parallel processing system having a limited number of partitions. As will become apparent from the subsequent example, increasing the number and size of the processing nodes and partitions, creates an increasingly complex task for the system administrator attempting to properly partition and allocate the switching resource.

Figure 5:
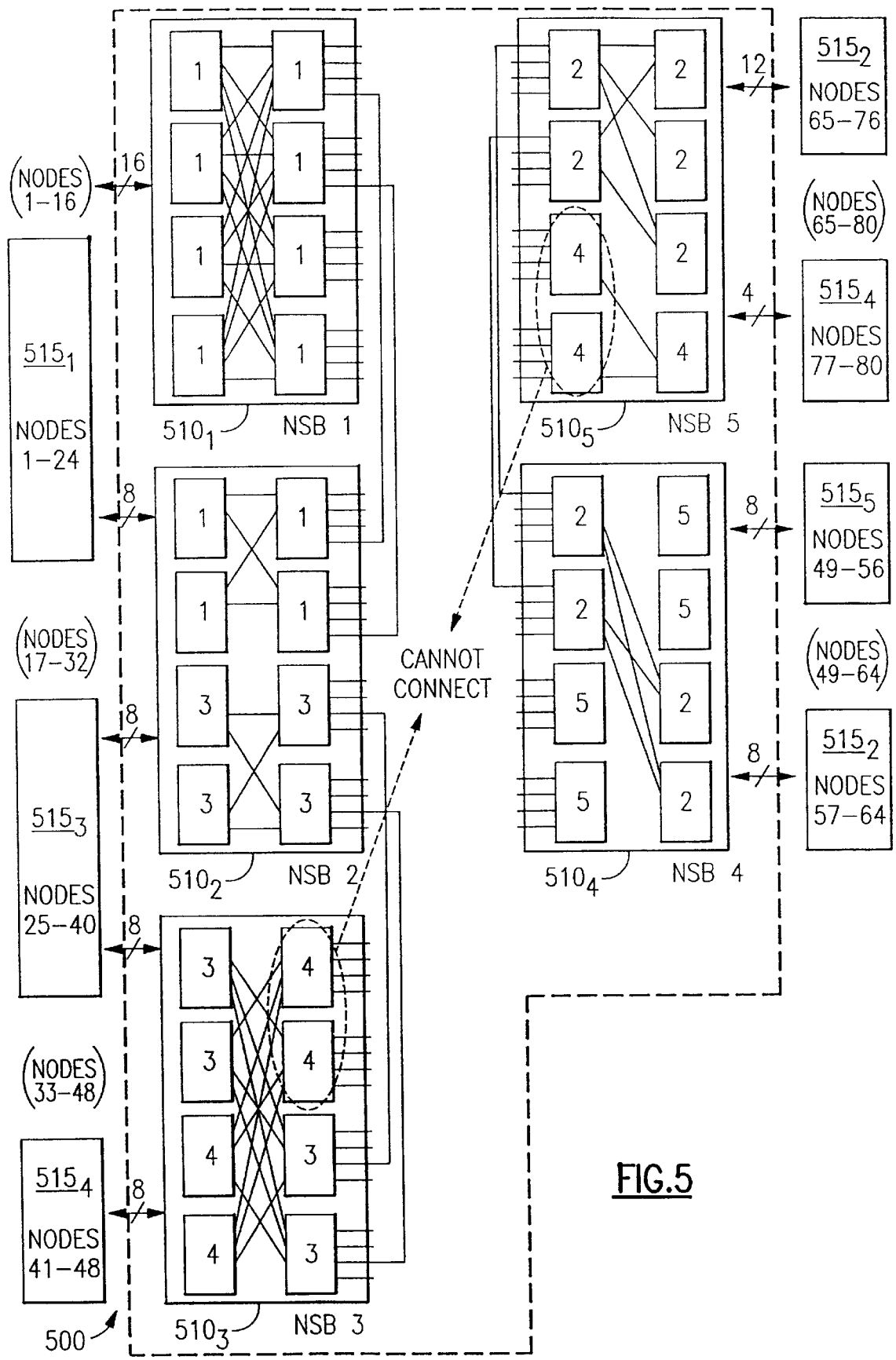
FIG. 5 Illustrates a failed attempt to manually partition the switching resource in an 80 node parallel processing system having five directly connected NSBs and having five system (node) partitions, into five corresponding switch partition objects.

We will now consider the 80 node parallel processing system 500 depicted in FIG. 5. This system is substantially similar to the 64 node parallel processing system 400 depicted in FIG. 4., with the additional 16 nodes (processing nodes 65–80) being connected to a fifth NSB $510_5$ and each of the LSCs on the NSBs (NSBs 1–5 or $410_1$–$410_5$) capable of being connected once to a corresponding LSC on each of the other NSBs. The 80 node parallel processing system 500 includes 5 node partitions, in particular node partitions $515_1$–$515_5$ (or alternatively partitions 1–5) which collectively comprise the 80 processing nodes of the larger system. Partition 1 consists of nodes 1–24, these node correspond to the ports on NSCs 1–4 on NSB 1 and NSC 1 and 2 on NSB 2. Partition 2 consists of nodes 57–76 which are coupled to NSC 3–4 on NSB 4 and NSC 1, 2 and 3 on NSB 5. Partition 3 includes nodes 25–40 which are coupled to NSC 3 and NSC 4 on NSB 2 and to NSC 1 and NSC 2 on NSB 3. Partition 4 consists of nodes 41–48 which are coupled to NSC 3 and NSC 4 on NSB 3 and nodes 77–80 which are coupled to NSC 4 on NSB 5. Finally, partition 5 consists of nodes 49–56 which are coupled to NSC 1 and NSC 2 on NSB 4.

For ease of implementation we shall attempt to manually allocate the switch resource among the partitions in decreasing size order. Beginning with partition 1 and cognizant of the fact that the switch partition object allocated to partition 1 will traverse multiple NSBs (i.e. that it is a multi-board partition) we know we must allocate at least two LSCs per NSB to the partition. For partition 1 we will assign LSC 1–LSC 2 on NSB 1 and accordingly LSC 1 and LSC 2 on NSB 2 to complete the switch partition object allocated to node partition 1. Next we turn to partition 2 wherein we will assign LSC 1 and LSC 2 on each of NSB 4 and 5 to complete the switch partition object therefor. For partition 3 we see that only LSC 3 and LSC 4 are available on NSB 2, thus we assign LSC 3 and LSC 4 on both NSB 2 and NSB 3 to complete the switch partition object for partition 3. In accordance with the manual switch partitioning scheme we now address partition 4. For partition 4 we can utilize the remaining LSC 1 and LSC 2 from NSB 3 (LSC 3 and LSC 4 were previously used for the switch partition object associated with partition 3), however a problem arises herein due to the fact that the corresponding LSC 1 and LSC 2 on NSB 4 which would be required to complete this switch partition object, are not available. As you will recall, we had previously assigned LSC 1 and LSC 2 on NSB 4 for the switch partition object corresponding to partition 2. Thus, our attempt to manually partition the switching resource for the 80 node parallel processing system 500 has failed. While it may be possible to go back to partition 2 and reassign switch resource into a workable set of switch partition objects, the foregoing exercise exemplifies the inefficiencies attendant to a manual trial and error switch allocation technique. As previously noted, these inefficiencies would be expected to grow as a function of the size of the parallel processing system and the number of required partitions.

Figure 6:
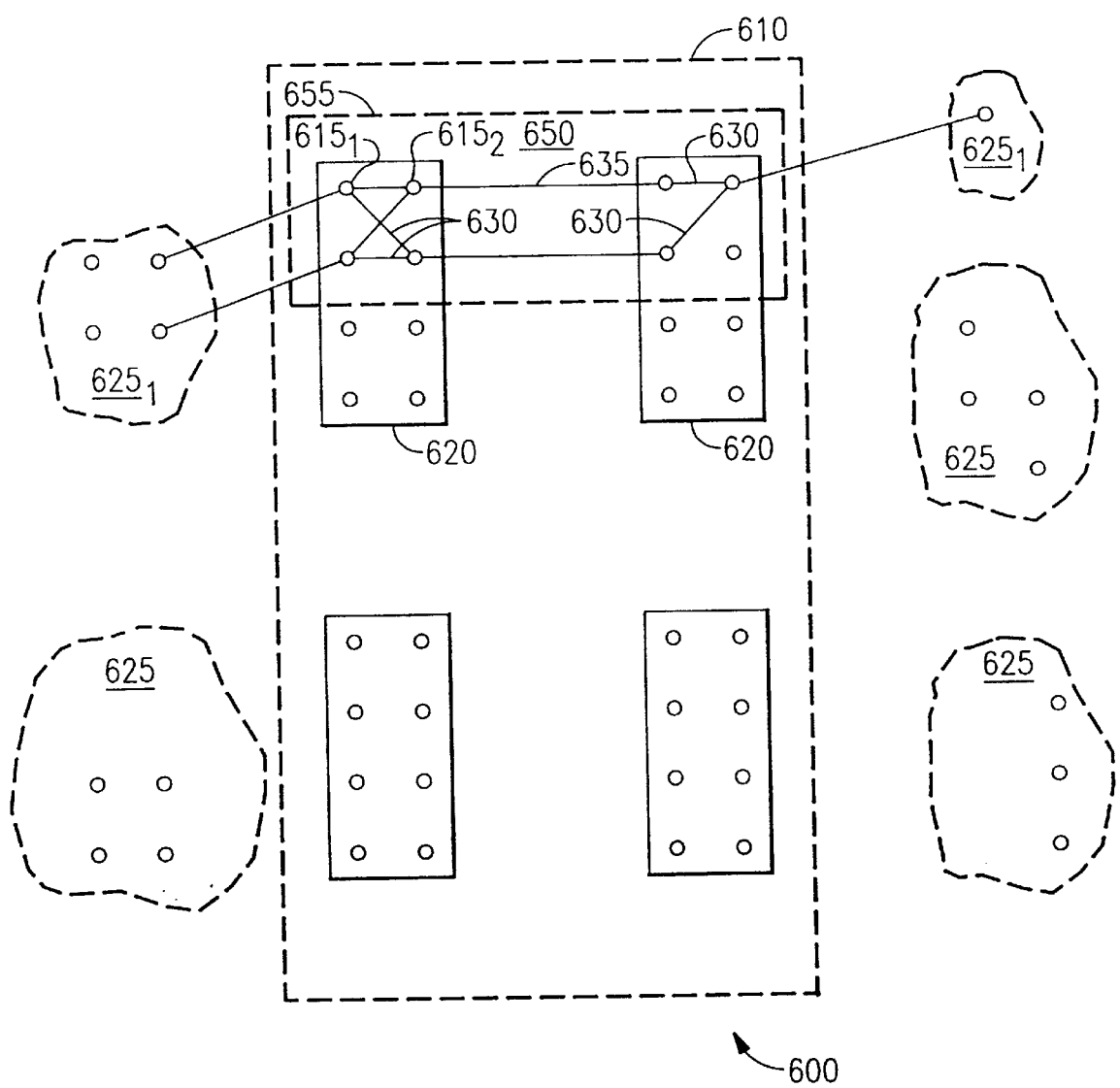
FIG. 6 Depicts an exemplary data processing environment, in which the inventive fabric partitioning techniques may be implemented.

The foregoing failed attempt to manually partition and allocate the switch resource to the disjoint sets of processing nodes points out the need for a systematic approach to partitioning a shared resource among disjoint sets of nodes so as to provide sets of disjoint resource partitions corresponding to the disjoint sets of nodes. While subsequent examples will address such an inventive technique directed toward implementation within massively parallel processing systems having eighty and one hundred twenty eight processing nodes respectively, it will be apparent to one of ordinary skill in the art, that the technique may be successfully applied to other analogous environments with equal success. In particular, and via reference to FIG. 6, the invention is applicable to any data processing environment 600 in which a resource fabric or interconnection medium 610 may be classified as comprising a plurality of discrete elements 615 which in turn constitute at least one group of elements 620, and wherein the cumulative total of such groups of elements constitutes the fabric. The elements within this fabric may, for example, be switch elements or memory or any other resource capable of serving as a mechanism for interconnecting external nodes, and thereby acting as a shared resource. The elements are further classified as node elements $615_1$ and link elements $615_2$ and each group within the fabric includes at least one node element and at least one link element. Within such a system, a plurality of disjoint sets of nodes 625, which may without limitation be processing nodes, are initially connected to node elements in the fabric but are not interconnected to one another. Each node from each disjoint set connects to a different node element in the fabric. The node elements are subsequently interconnected by connecting to link elements within the same group to connect to node elements within the same group 630, and by connecting to link elements 635 which in turn connect to link elements in other groups over the connection matrix 650 to connect node elements in different groups. A plurality of such interconnected sets each define a fabric partition (for example partition 655). The inventive technique addressed herein seeks to create such fabric partitions wherein disjoint partitions of elements within the fabric serve to interconnect the nodes within each disjoint set (.i. set $625_1$ as shown), but wherein nodes from disparate disjoint sets 625 do not share any fabric elements and accordingly do not interconnect.

Figure 7:
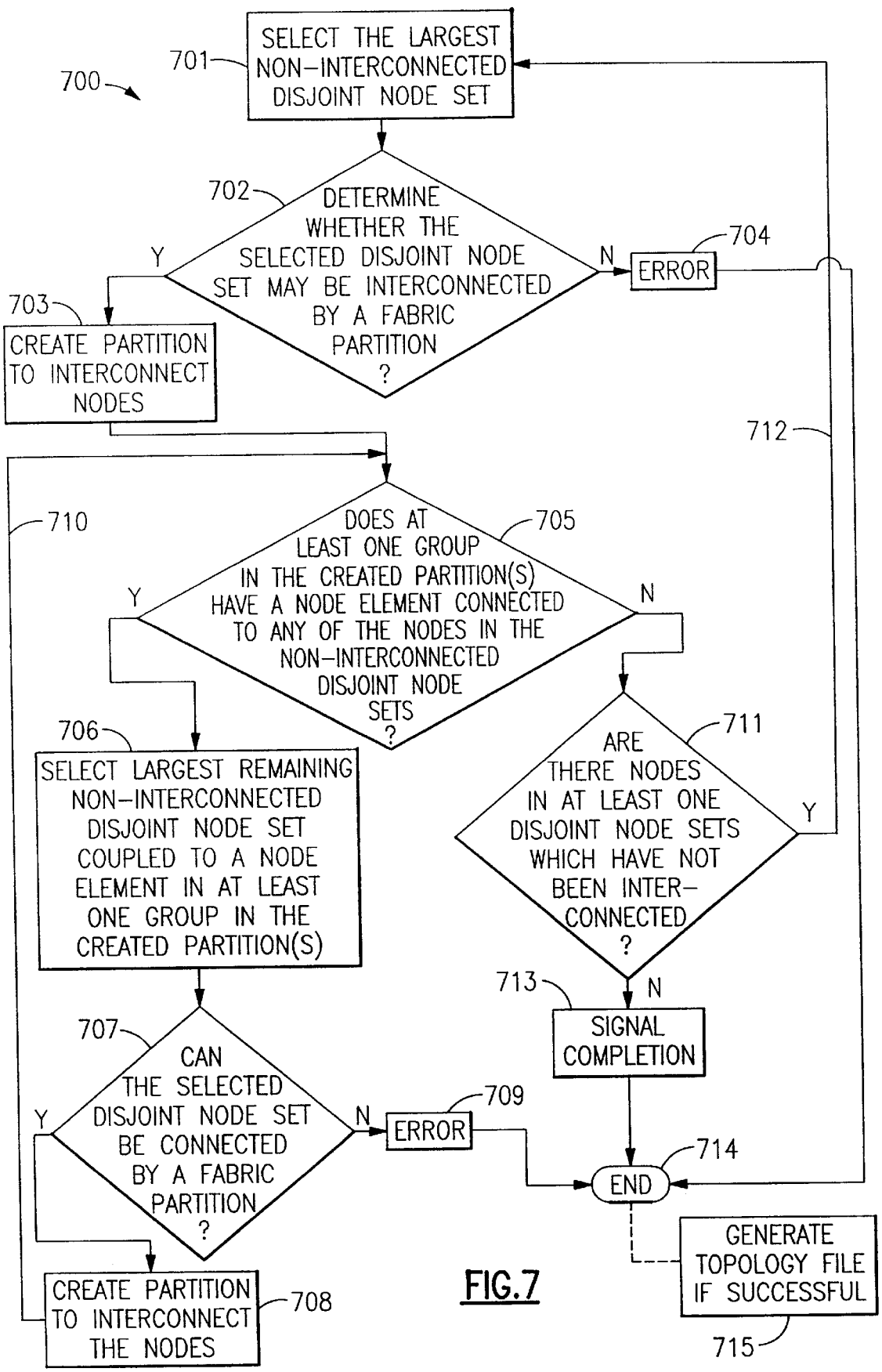
FIG. 7 Shows a flow diagram for the inventive partitioning technique for creating disjoint interconnection fabric partitions to correspond to and interconnect disjoint node sets.

In data processing systems characterized by the foregoing attributes, the present inventive technique may be applied in a manner in accordance with the flow diagram 700 illustrated in FIG. 7. In the first step 701, the nodes within the largest of the disjoint node sets connected to the fabric, are selected 701. Next, in step 702 it is determined whether there are a sufficient number of link elements available to interconnect the node elements, so that a fabric partition may be created which interconnects the nodes within the selected disjoint node set. If a sufficient number of link elements are available, the partitioning of the fabric is successfully implemented 703 and the nodes in the disjoint set are interconnected, however if there is inadequate link element resource in the fabric to accommodate the interconnection 702 a failure is signalled to the user 704 and the process is ended 714. Assuming that the partition successfully interconnects the disjoint node set, processing continues to step 705 wherein it is determined whether there are any node elements situated within groups which participate in an existing fabric partition which are connected to disjoint node sets which have not yet been interconnected through the fabric partitions. In other words, there may be groups of elements wherein one or more of the node elements therein is included in an existing partition but another one or more node elements in the same group are not included any generated partition, and these non-included elements are in turn connected to nodes in another disjoint node set which have not yet been interconnected by partitioning the fabric. If such node elements exist, processing proceeds to step 706 wherein the next largest non-interconnected disjoint node set which is coupled to an element in a group which participates in one of the existing partitions is selected. Next, in step 707 it is determined whether there a sufficient number of link elements are available to interconnect the node elements so as to create a fabric partition for interconnecting the nodes in the selected disjoint node set. If is determined that a sufficient number of link elements are available, the node elements and link elements are connected and the nodes within the selected disjoint node set are in turn interconnected via a new partition in the fabric 708. If, on the other hand, it is determined that an insufficient number of link elements are available, the partition cannot be created and the interconnection of nodes within the selected disjoint node set fails, the error is signalled to the user 709 and the process is ended 714. Alteratively, if the interconnection is successful, processing loops back 710 to step 705 wherein it is once again determined whether there are any more node elements situated within groups of an existing fabric partition which do not form part of the partition and which in turn are connected to nodes within disjoint node sets which have not yet been interconnected through a fabric partition. The process iterates the loop from steps 705–708 until no more of the previously described elements exist. At this point processing proceeds from step 705 to step 711 wherein it is determined whether any disjoint node sets have yet to be interconnected. If it is determined that such non-interconnected disjoint node sets exist, processing loops back 712 to step 701. Once it has been determined 711 that no further non-interconnected disjoint node sets remain, the successful completion of the process is signalled 713 and the process is ended 714.

With the foregoing process it is possible to systematically and optimally partition a contiguous fabric of interconnection resources into disjoint partitions corresponding to and interconnecting nodes within disjoint sets of nodes. Such a procedure would find ready applicability in systems wherein the fabric comprises shared memory devices, including without limitation, symmetric multiprocessing systems, as well as in systems where the fabric comprises an interconnection element such as a switch or a router as in a local or wide area network or within the communications backplane of a massively parallel processor as described herein. The process may, without loss of generality, be embodied in a computer program, which when provided with a set of disjoint nodes as input, generates a topology file 715. The topology file may be implemented in the data processing system to be partitioned so as to define the partitioning of the fabric and the resultant interconnection of the nodes within disjoint node sets across the fabric. Those skilled in the art will readily appreciate that certain modifications would need to be implemented to accommodate the application of previously described inventive process to a particular data processing system. The remainder of this detailed description will focus on adapting the inventive process to implementation within the exemplary massively parallel processing systems 300 and 500.

We will first consider the application of the partitioning implementation 700 depicted in FIG. 7 to the 80 node parallel processing system 500 in which our previous manual partitioning attempt failed to properly interconnect the five disjoint node sets (node partitions 1–5). For ease of understanding our implementation of the above-described partitioning techniques within the parallel processing system 500 will be supplemented by alternate references to FIG. 8 which depicts the successfully partitioned parallel processing system 800 resulting from the application of the foregoing techniques, and to FIG. 9 which includes FIGS. 9A and 9B taken together to be read as a single connected illustration in which a flow diagram 900 itemizes the steps required for implementation of the foregoing technique within our previously described eighty node massively parallel processing system.

Figure 8:
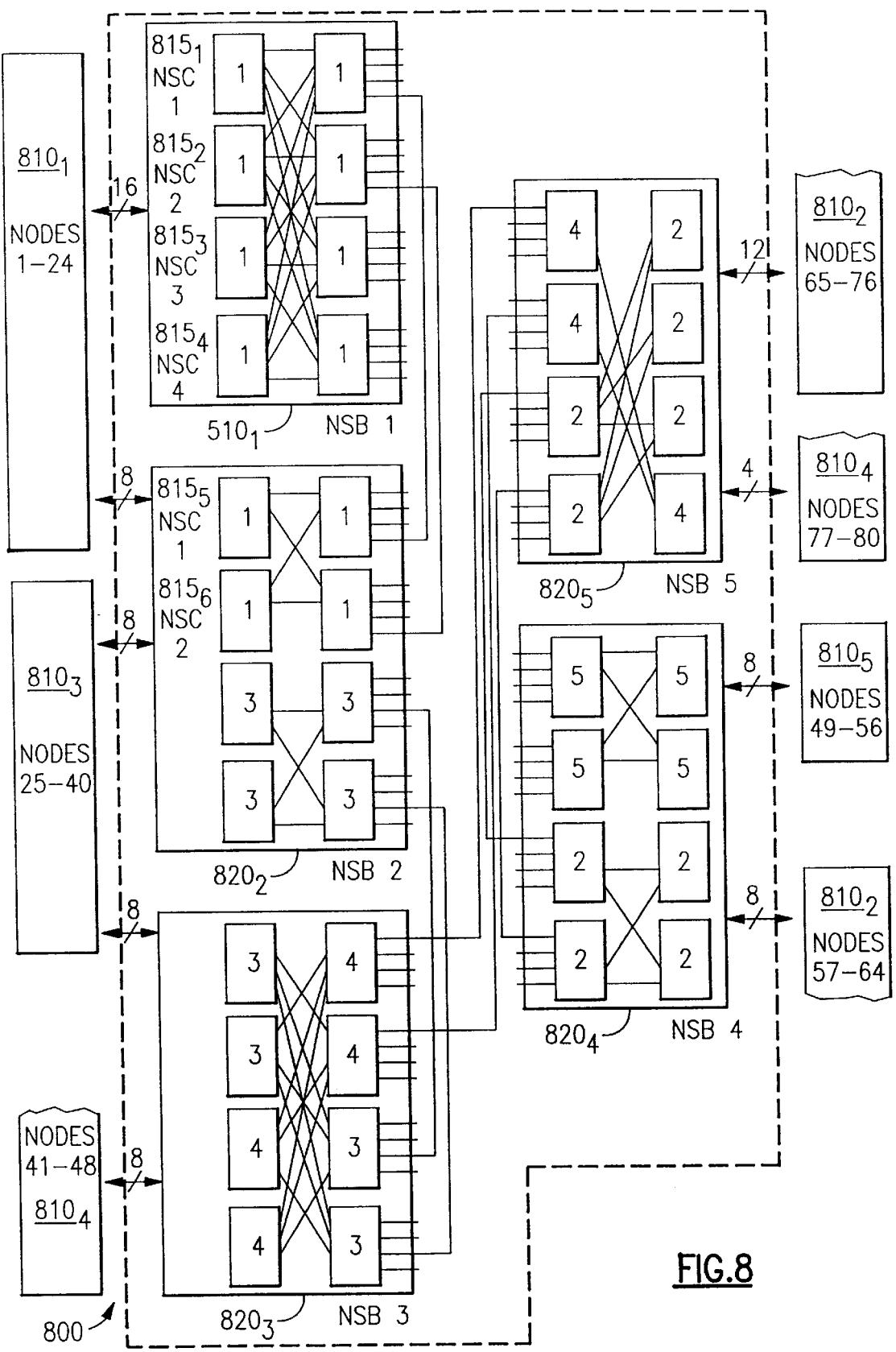
FIG. 8 Depicts a successful partitioning of the switching resource in the illustrated 80 node parallel processing system via implementation of the herein described inventive techniques.
Figure 9A:
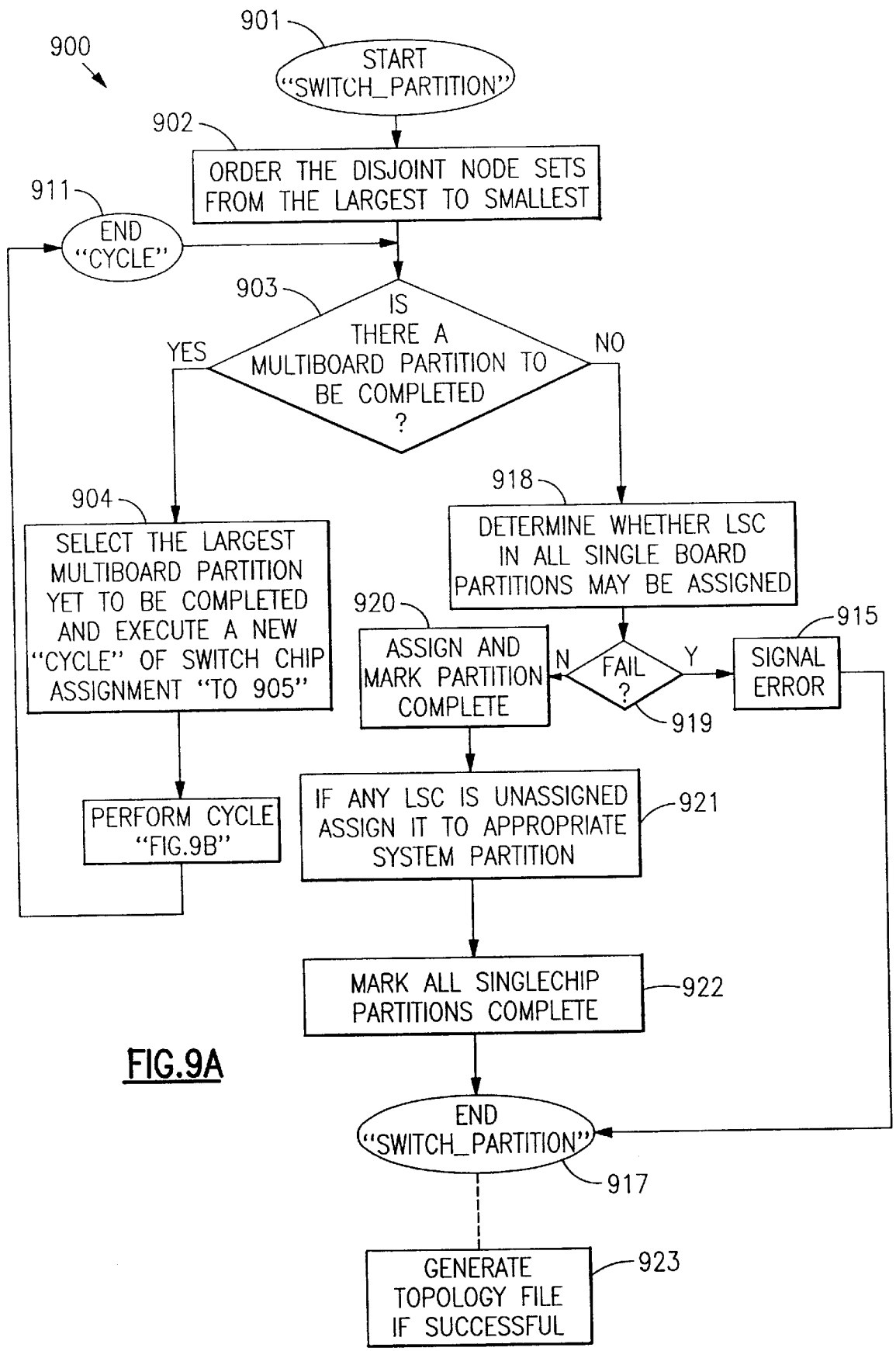
FIGS. 9A and 9B taken together, illustrates a flow diagram representing the sequence of steps for the inventive switch partitioning techniques which are applied to the switch resource partitioning for the illustrated 80 node parallel processing system.
Figure 9B:
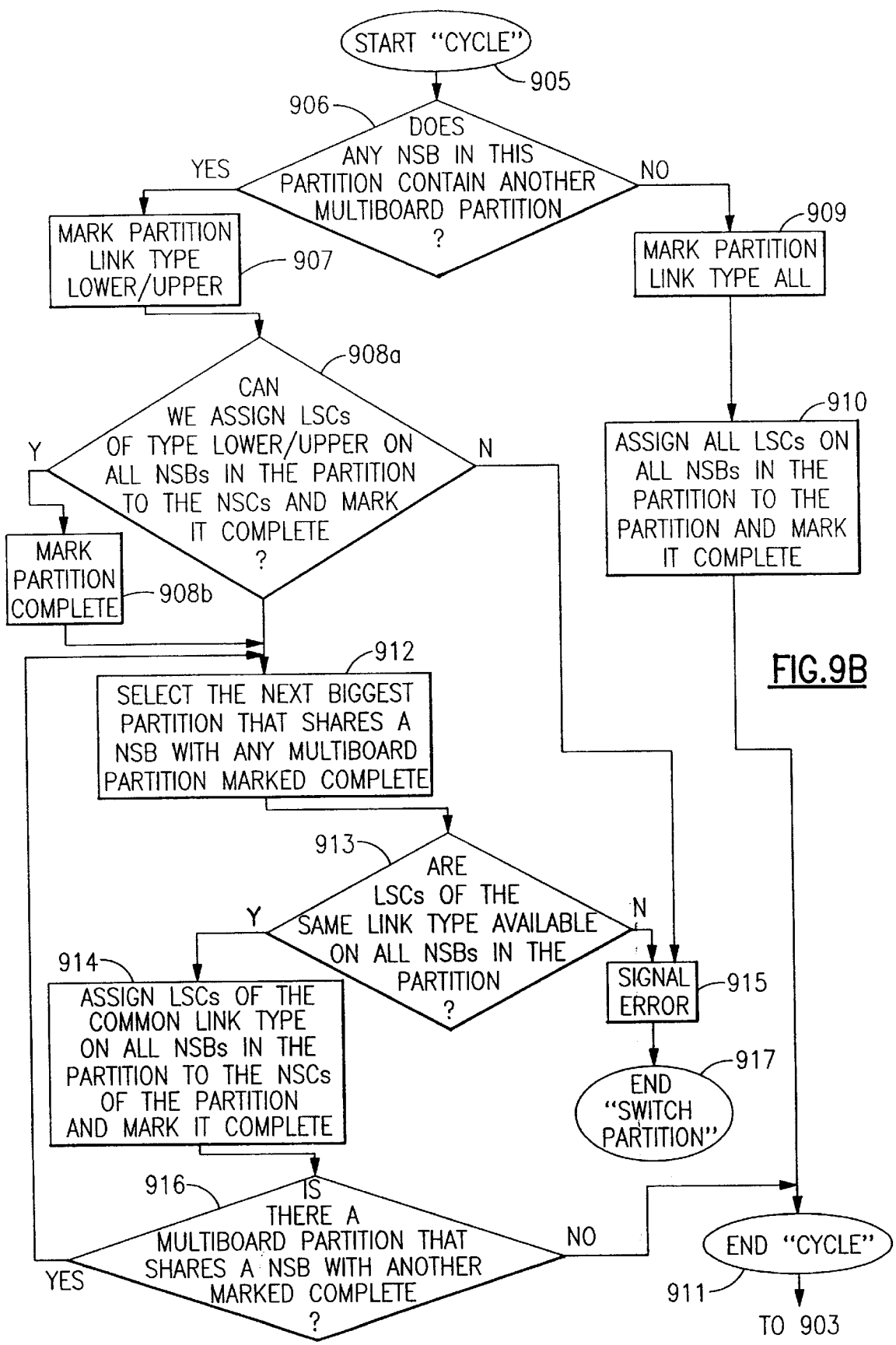

Referring to FIG. 9 we see that the first step 901 starts the partitioning process. We next proceed to step 902 wherein we order the disjoint node sets from largest to smallest. By reference to FIG. 8 we can see that the node partitions 1–5 $810_1$–$810_5$ respectively are ordered from largest (partition 1 having 24 nodes) to smallest (partition 5 including 8 nodes). Next in step 903 we are asked to determine whether there are any multi-board partitions to be completed. Via reference to FIG. 8 we can see that partition 1 $801_1$ includes NSCs on multiple switch boards (specifically NSC 1–4 $815_1$–$815_4$ on NSB 1 $820_1$ and NSC 1–2 $815_5$–$815_6$ on NSC 2 $820_2$. We can also see that partition 2 which includes 20 nodes will require more than a single switch board, as it connects to NSCs on NSB 4 $820_4$ and NSB 5 $820_5$ respectively and that partitions 3 and 4 are also implemented via their connections to the NSBs as multi-board partitions. Thus, we answer the decision box 903 by traversing the "yes" path to step 904 wherein the largest multi-board partition that has not yet been completed is chosen and a new "cycle" of switch chip assignment is initiated 905 illustrated in connected FIG. 9B. In the example in FIG. 8 we will select partition 1. In step 906 it is determined whether any NSB within the partition to be connected includes another multi-board partition. In other words, whether NSCs on an NSB in the chosen partition are connected to nodes from another partition. In the exemplary eighty node system 800, we see that NSB 2 820$_2$ participates in a multi-board partition for both partition 1 and partition 3, thus we traverse the "yes" branch from this decision box. Processing continues to step 907 wherein the partition link type is designated as either upper or lower. The partition link type is simply a designator to differentiate between pairs of LSCs on a given switch board when they are used to interconnect different node partitions. You will recall the we have previously noted the requirement that each NSC connect to at least two LSCs in order to accomplish a connection to an NSC on another NSB. Accordingly, for our purposes we shall assign the link type for partition 1 as upper, and proceed to step 908 wherein we determine whether we can connect the assigned LSCs to the NSCs for the partition. In the present example we connect the upper pair of LSCs (i.e. LSC 1 and LSC 2 on NSB 1 and NSB 2) to the NSCs connected to the nodes for partition 1 (in particular we connect NSC 1–2 to LSC 1 and 2 on NSB 1 and NSC 1–2 to LSC 1–2 on NSB 2). Since we have previously shown that LSCs may be connected to corresponding LSCs on different switch boards, we can utilize the connections between LSC 1 on NSB 1 and NSB 2 and between LSC 2 on NSB 1 and NSB to interconnect the NSCs, thus we shall consider partition 1 COMPLETE 908 and traverse the "yes" branch to step 912. Alternatively, if it were determined that there was an insufficient number of LSCs available to connect the NSCs for partition 1, we would traverse the "no branch" wherein we would signal and error to the user 915 and end the program 917.

Turning back to decision box 906, if each of the NSBs within the partition did not contain other multi-board partitions per decision box 906, we would traverse the "no" branch to step 909 wherein the link partition type could be designated as "all" (since all of the LSCs on the switch boards for the partition are available to interconnect the processing nodes). In step 910 all LSCs on the NSBs in the partition are then assigned to the partition by connecting them to the NSCs therein, the partition is thereafter considered COMPLETE and the "cycle" is ended 911.

Since we have determined that an NSB within partition 1 contains another multi-board partition (specifically that NSB 2 has NSCs (NSC 1 and 2) which are connected to partition 1 and other NSCs (NSC 3 and 4) which will be connected to partition 3), we continue our "cycle" in step 912 wherein the next largest partition which connects to an NSB which has switch chips thereon within a COMPLETE multi-board partition is selected. In system 800 this would be partition 3 which connects to NSC 3–4 on NSB 2, wherein NSB 2, as we have previously noted, participates in completed partition 1 as well. Next in decision box 913 we determine whether LSCs of the same link types are available on all of the NSBs included in partition 3 (i.e. in system 800 this would be NSB 2 and NSB 3). Since we have already used the "upper" link type on NSB 2 to connect LSC 1 and LSC 2 for partition 1 we are required to select link type "lower" for partition 3. We can see that on both NSB 2 and NSB 3 the lower two LSCs (LSC 3 and LSC 4) are not yet connected in any partition, as such we can traverse the "yes" branch from decision box 913.

Alternatively, if LSCs of the same link type were not available within all of the NSBs for partition 3, the partition could not be successfully interconnected. In this case we would traverse the "no" branch of decision box 913 to step 915 wherein an error is signalled to the user 915 and the switch partition program is ended 917.

Since we have LSCs of link type lower available on all NSBs for partition 3 we proceed to step 914 wherein the LSC 3 and LSC 4 on NSB 2 and NSB 3 are assigned to the NSCs for partition 3 (NSC 3 and 4 on both NSB 2 and NSB 3) and, since we know that we can connect corresponding LSCs on the two NSBs, the NSCs may be interconnected and partition 3 is termed COMPLETE. Next, in decision box 916 we determine whether any NSB in the now two complete partitions (i.e. partitions 1 and 3) includes another multi-board partition. Via inspection of system 800, we see that NSB 3 which has now had LSC 3 and LSC 4 thereon assigned to completed partition 3 also includes node switch chips which are part of multi-board partition 4. Specifically, multi-board partition 4 includes NSC 3 and 4 on NSB 3 and NSC 4 on NSB 5. Thus, we may traverse the "yes" branch of the decision box 916.

Alternatively, if we had determined that no other multi-board partitions attached to the NSBs in the COMPLETED partitions, we would traverse the "no" branch of decision box 916 and the cycle would be ended 911. In this case no other multi-board partitions would share a switch board with the already COMPLETED partitions.

In the present example utilizing system 800 in FIG. 8 we note that we proceed from decision box 916 and loop back to step 912 wherein we select the largest partition that uses an NSB already participating in a COMPLETED partition. Here we select partition 4 since it is the only partition satisfying the foregoing criterion. Next we proceed to decision box 913 where we determine whether LSCs of the same link type are available on the NSBs for partition 4. Since partition 3 has previously been assigned the LSCs of link type "lower" on NSB 3 we must use link type "upper" for the LSCs of partition 4. Via inspection of FIG. 8 it is apparent that the LSCs with link type upper (i.e. LSC 1 and LSC 2) are also available on NSB 5 and accordingly we traverse the "yes" branch of decision box 913. In step 914 we connect the NSCs to the LSCs for partition 4 and label it COMPLETE. At decision box 916 we note that partition 2 is a multi-board partition that shares NSB 4 with completed partition 4, thus we traverse the "yes" branch and once again loop back to step 912. At step 912 we select partition 2 as it is the only partition sharing an NSB with COMPLETED partitions. At decision box 913 we note that the "upper" LSC link types for NSB 5 are taken by partition 4, so we look to see whether all of the NSBs for partition 2 have "lower" link type LSCs available. By inspection of FIG. 8 we see that LSC 3 and 4 are available on both NSB 4 and NSB 5 which comprise partition 2 and we therefore traverse the "yes" branch. At step 914 we connect the NSCs and LSCs of partition 2 with NSC 3–4 connecting to LSC 3–4 on NSB 4 and NSC 1–3 connecting to LSC 3–4 on NSB 5. Thereafter partition 2 is termed COMPLETE. Finally at decision box 916 we note that the only remaining partition (partition 5) is not a multi-board partition, thus we traverse the "no" branch and the cycle is ended 911.

Upon ending the cycle the process loops back to decision box 903 wherein we determine whether any multi-board partitions have yet to be completed. Inspection of FIG. 8 now reveals that partition 5, the only remaining partition, is not a multi-board partition, but is instead a single-board partition. Accordingly, we traverse the "no" branch of decision box 903 to step 918. At step 918 we determine if we can connect LSCs to all single-board partitions. As we have noted, partition 5 is a single-board partition including NSC 1 and 2 on NSB 4 and thus we assign LSCs to these NSBs to attempt to COMPLETE the partition. If the assignment fails due to lack of sufficient LSCs 919 we signal an error 915 to the user and exit the program 917. In our case 2 "upper" type LSCs are available for the NSCs, (LSCs 1 and 2 may be connected to NSCs 1 and 2 on NSB 4 for partition 5) thus we connect these LSCs and mark partition 5 COMPLETE 920. Next we proceed to step 921 wherein any unassigned LSCs are assigned to the appropriate system partition. We note by reference to system 800, that LSC 3 and 4 on NSB 1 have not yet been assigned. Since partition 1 includes all of the node switch chips for NSB 1 we assign the two remaining LSCs to these NSCs for partition 1 to provide greater connectivity therefor. Finally, if the system includes any single chip partitions, these do not require connection to LSC an accordingly are immediately marked COMPLETE 922. In our exemplary eighty node system 800 there are no such single chip partitions thus the switch partition process is ended 917.

Via the foregoing example we have now provided a systematic and easily automated approach to partitioning the switch fabric of a massively parallel processing system to predefined disjoint node partitions. These techniques, when incorporated into a computer program provide a powerful tool for a system administrator seeking to optimally partition such a processing system. As previously noted, the switch partitioning techniques detailed above would preferably be implemented via a computer program which when provided with the node partitions and the switch arrangement for a partitioned massively parallel processing system as input would generate a topology file 923 for enabling and disabling the physical links interconnecting the switch chips, thereby implementing the switch partition objects.

We have previously noted that massively parallel processing systems of the type previously described herein which have more than eighty processing node, require intermediate switch boards (ISBs) to provide the needed connectivity between the nodes. For example, system 300 depicted in FIG. 3 shows a one hundred twenty eight node system with eight NSBs and four ISBs. The task confronting a system administrator seeking to partition such a relatively large system involves even more complex considerations than those encountered in the failed manual switch partition and allocation for the exemplary eighty node system. This complexity will become apparent upon attempting such a manual partition of the illustrative one hundred twenty eight node system 300 as illustrated by manually partitioned system 1000 in FIG. 10.

In accordance with, and similar to the requirements for ensuring reliable inter—NSB communications for multi-board partitions for the 80 node system, which necessitated the connection of each NSC participating in a multi-board partition to at least two LSCs on its associated NSB, we will additionally require that each LSC which seeks to make a "cross over" connection (i.e. a connection that traverses the 2 halves of an ISB to connect an NSC on an NSB in stage 1 to a NSC on an NSB in stage 2) be connected to at least two corresponding ISCs on at least two ISBs. By way of example, if NSC 1 on NSB 1 were to be connected to NSC 1 on NSB 5, NSC 1 on NSB 1 could for example connect to LSC 1 and LSC 2 on NSB 1 and NSC 1 on NSB 5 could likewise connect to LSC 1 and LSC 2 on NSB 5. The LSCS would each in turn connect to 2 corresponding ISCs on either of the half ISBs. In other words, and by way of example, LSC 1 on NSB 1 could connect to ISC 1 on ISB 1 and ISB 2 and LSC 2 on NSB 1 could connect to ISC 2 on ISB 1 and ISB 2. Correspondingly, LSC 1 and LSC 2 on NSB 5 could connect to ISC 1 and ISC 2 respectively on ISBs 1 and 2 on the opposite half of these ISBS. For ease of implementation we will designate ISB 1 and 2 as upper ISBs and ISB 3 and 4 as lower ISBs and will impose the rule that a given NSC, through its corresponding two LSCs on the NSB must connect to a total of four ISCs (two ISCS for each LSC) with all of the ISCs being in either the upper or lower two ISBs.

It is permissible within a system such as system 300 for cross over traffic to switch from upper ISCs (i.e. ISC 0 and 1) to lower ISCs (i.e. ISCs 2 and 3) while traversing an ISB. Such a transition from upper to lower ISCs within an ISB is acceptable, so long as it is possible to create connections to corresponding LSCs from each of the half ISBs. For example, if NSC 1 connected to LSC 1 and 2 on NSB 1 and NSC 1 connected to LSC 3 and 4 on NSB 5, we may interconnect the two NSCs through ISB 1 and 2 (or alternatively through the lower ISBs 3 and 4) by coupling LSC 1 and 2 from NSB 1 to ISC 1 and 2 respectively on ISB 1 and ISB 2 while concurrently connecting LSC 3 and 4 on NSB 5 to ISC 3 and 4 respectively on ISB 1 and 2. Within ISB 1 and 2 the connection between ISC 1 and 2 on the first half ISB and ISB 3 and 4 on the second half ISB accomplishes the intended interconnection of NSC 1 on NSB 1 with NSC 1 on NSB 5 while satisfying the previously imposed connectivity rules.

Figure 10B:
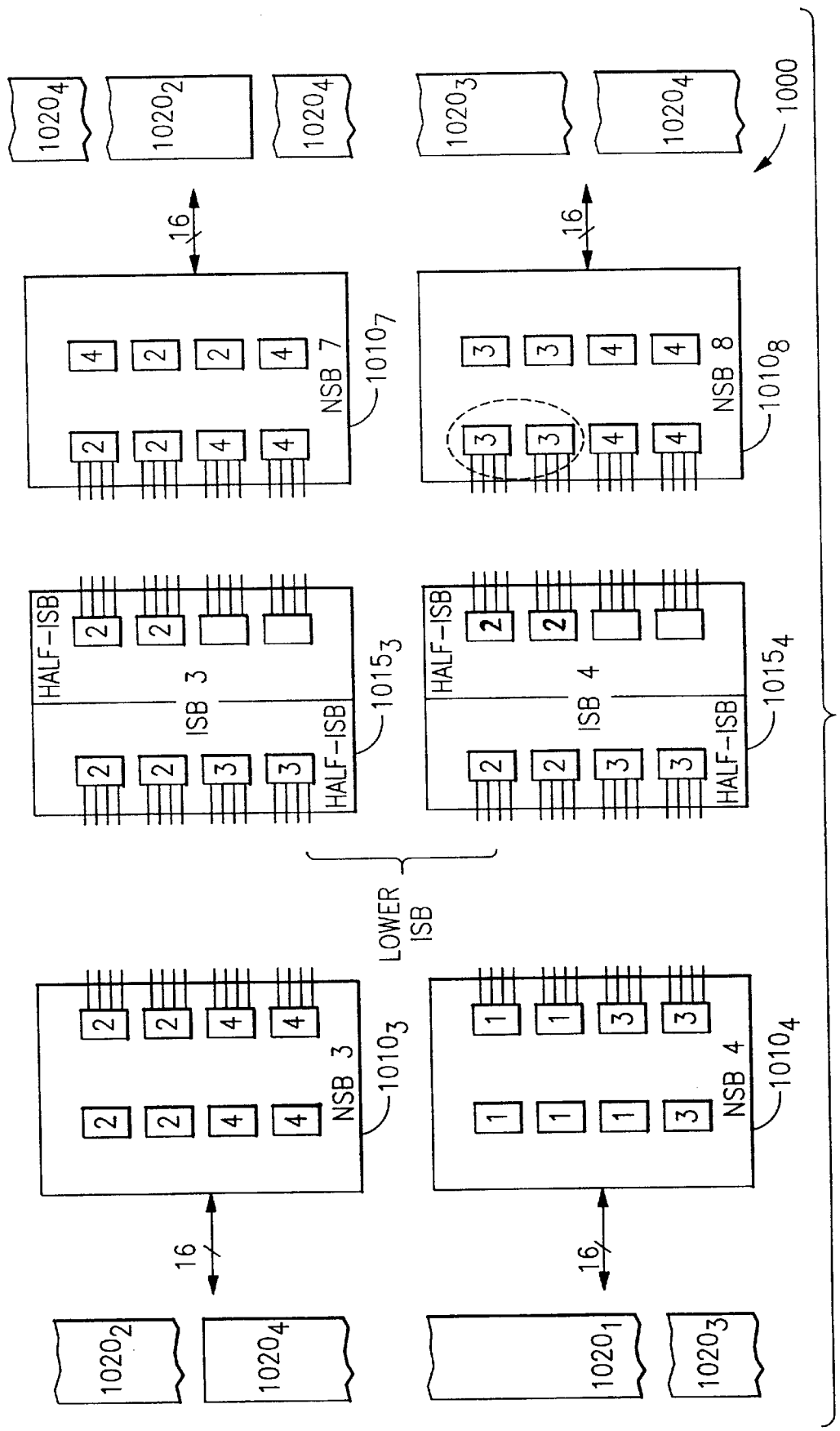

Turning now to our manual partitioning attempt for the one hundred twenty eight node system, we may refer to FIG. 10, which comprises FIG. 10A and FIG. 10B taken together, wherein system 1000, a one hundred twenty eight node parallel processing system which is substantially identical to the one hundred twenty eight node system 300 illustrated in FIG. 3 is presented. Within this massively parallel processing system 1000, we will attempt to manually partition the switching resource which includes 8 NSBs ($1010_1$–$1010_8$ or NSB 1–8) and 4 ISBs ($1015_1$–$1015_4$ or ISB 1–4), to accommodate 4 node partitions, specifically partitions $1020_1$–$1020_4$ which we will refer to for convenience as partitions 1–4 respectively. Each of the eight NSBs includes 4 NSCs specifically NSC 1–4 as shown by way of example on NSB 1 as $1025_1$–$1025_4$ and 4 LSCs specifically LSC 1–4 as shown by way of example on NSB 1 $1030_1$–$1030_4$. Each of the four ISBs includes eight ISC, specifically, ISC 1–ISC 4 $1035_1$–$1035_4$, as shown by way of example on ISB 1 on the first half ISB and ISC 1–4 $1040_1$–$1040_4$, as shown by way of example on ISB 1 on the second half ISB. Via inspection of the illustrated system 1000, we can see that partition 1 includes the nodes connected to NSC 1 and 2 on NSB 1 and the nodes connected to NSC 1, 2 and 3 on NSB 4, as well as the nodes connected to NSC 1–4 on NSB 5. Partition 2 includes NSC 1, 3 and 4 on NSB 2 and NSC 1 and 2 on NSB 3 as well as NSC 2 and 3 on NSB 7. Partition 3 includes NSC 3 and 4 on NSB 1, NSC 2 on NSB 2, NSC 4 on NSB 4, NSC 1 on NSB 6 and NSC 1 and 2 on NSB 8. Finally, partition 4 includes NSC 3 and 4 on NSB 3, NSC 2, 3 and 4 on NSB 6, NSC 1 and 4 on NSB 7 and NSC 3 and 4 on NSB 8.

Beginning with partition 1 we will create our switch partition objects. The interconnections of a 128 node system are difficult to represent graphically. Accordingly, rather than illustrating each of these connections, for purposes of clarity we will adopt the convention of denoting connections between the NSCs, LSCs and ISCs of a given switch partition object, by placing the number of that switch partition object (i.e. in our example either a "1", "2", "3" or "4") on the inside of each chip to be connected within that switch partition object.

Since NSC 1 and 2 on NSB 1 are included in partition 1 we connect them to LSC 1 and 2 on NSB 1 (the "upper" LSCs) (as illustrated by the "1" placed therein), and we connect LSCs 1 and 2 on NSB 1 to ISC 1 and 2 on the first half ISB of both ISB 1 and ISB 2 (similarly illustrated by the "1"'s in ISC 1 and 2 for ISB 1 and 2). Next we move to NSC 1–3 on NSB 4. Since we have defined the LSC link type as "upper" we use LSC 1 and 2 on NSB 4 which we assign to NSC 1–3 thereon. Next we connect LSC 1 and 2 from NSB 4 to ISC 1 and 2 on the first half ISB for ISB 1 and 2. Finally, for NSC 1–4 on NSB 5 we connect each of them to LSC 1 and 2 thereon which in turn connects respectively to ISC 1 and 2 on ISB 1 and 2. Since LSC 3 and 4 on NSB 5 will not be used to interconnect to any ISC (since all of the NSCs on NSB 5 are with partition 1 which has a defined link type of upper) they may be interconnected within NSB 5 to each of the NSCs 1–4. At this point we have completed the interconnection of the nodes for partition 1.

Next we may wish to connect to node partition 4 which includes nine NSCs. The first two NSCs are NSC 3 and 4 on NSB 3. Since we have not yet assigned a link type for partition 4 and since we have all 4 LSCs available on NSB 3 we will choose the lower link type, so that the remaining switch chips on the upper ISB types may be used, and accordingly we connect LSC 3 and 4 on NSB 3 to NSCs 3 and 4. Since partition 4 crosses over the ISBs we must next assign these LSCs to first half ISCs having a link type lower as well. Here, in accordance our prior choice of the upper ISBs, we will use the ISCs 3 and 4 on the first half of ISBs 1 and 2. Next we attempt to connect NSC 2–4 on NSB 6. Once again we can choose any of LSC 1–4 on NSB 6, accordingly we will assign a link type of lower and use LSCs 3 and 4 such that we can create cross over connections for these LSCs which use the lower two ISCs on the second half ISBs. Here we choose the lower ISCs on the upper two ISBs to complete the inter connection of the NSCs in the first and second system halves, and accordingly, ISC 3 and 4 on the second half ISB for ISB 1 and 2 are connected to LSC 3 and 4 on NSB 6. Next we attempt to connect NSC 1 and 4 on NSB 7. Here we already have established the link type for partition 4 as lower on this system half (pursuant to our assignment of NSB 6) thus we assign LSC 3 and 4 on NSB 7 to NSC 1 and 4. Since we have already assigned ISC 3 and 4 on the second half ISBs for ISB 1 and 2, we may assign LSC 3 and 4 on NSB 7 to these ISCs to complete the cross over connection. Finally, the last two NSC for partition 4, NSC 3 and 4 on NSB 8 are connected to LSC 3 and 4 thereon (since we have previously established a lower link type), these LSCs in turn connect to the aforementioned ISC 3 and 4 on the second half ISBs for ISB 1 and 2 and the switch partition object for partition 4 is complete.

Next we turn to node partition 2. In the first stage of the system we note that for NSB 3 we have already assigned the lower LSCs to partition 4, thus for stage one we will be using upper LSC link types for partition 2. Thus, for NSC 1, 3 and 4 on NSB 2 we assign the upper two LSCs (LSC 1 and 2) thereon and for NSC 1 and 2 on NSB 3 we also assign LSC 1 and 2. Next we create the cross over connections for the stage one LSCs for partition 2. Since we are using upper type LSCs we know that we must use upper type ISCs, and since the upper type ISCs for the upper ISBs (i.e. ISB 1 and 2) have previously been assigned to the stage 1 LSCs for partition 1, we now use ISC 1 and 2 on the first half ISBs for ISB 3 and 4 for connecting the stage one LSCs of partition 2. We next turn to stage 2 for partition 2 where we note that NSC 2 and 3 on NSB 7 must use the upper LSC links (since the lower LSC links (LSC 3 and 4) were assigned to partition 4), and accordingly we connect NSC 2 and 3 to LSC 1 and 2 on NSB 7. To create the cross over connections for the stage 2 LSCs for partition 2 we note that we require upper type ISCs to correspond to the upper type LSCs previously assigned. Thus, we select the upper ISCs in the lower two ISBs, since the upper ISCs for ISB 1 and 2 have previously been assigned to the stage two LSCs for partition 1. With this assignment partition 2 is complete.

Finally, we turn to partition 3. In stage one we observe that we are restricted to lower type LSCs of each of NSBs 1, 2 and 3. Since LSC 3 and 4 are available we can assign them to the corresponding NSCs for partition 3 as follows: NSC 3 and 4 to LSC 3 and 4 on NSB 1, NSC 2 to LSC 3 and 4 on NSB 2 and NSC 4 to LSC 3 and 4 on NSB 4. Next we attempt to connect each of these LSCs to lower type ISCs to make the cross over connection. Since lower type ISCs (i.e. ISC 3 and 4) are available on the lower ISBs (ISB 3 and 4) we can complete the connections for stage one of partition 3. Next we turn to the stage two connections for partition 3. Here we know that we must use lower LSC links because there are no remaining upper ISC links available. By inspection of the system 1000 it can been seen that the only remaining ISCs available to complete the cross over connection for stage two of partition 3 are ISCs 3 and 4 on the second half of ISBs 3 and 4. Upon inspection of NSB 6 and NSB 8, each of which includes NSCs for partition 3, it is clear that the lower type LSCs required to complete this assignment have already previously been assigned, in both cases to partition 4. Thus, our manual partitioning attempt for the one hundred twenty eight node system 1000 has failed.

Figure 11B:
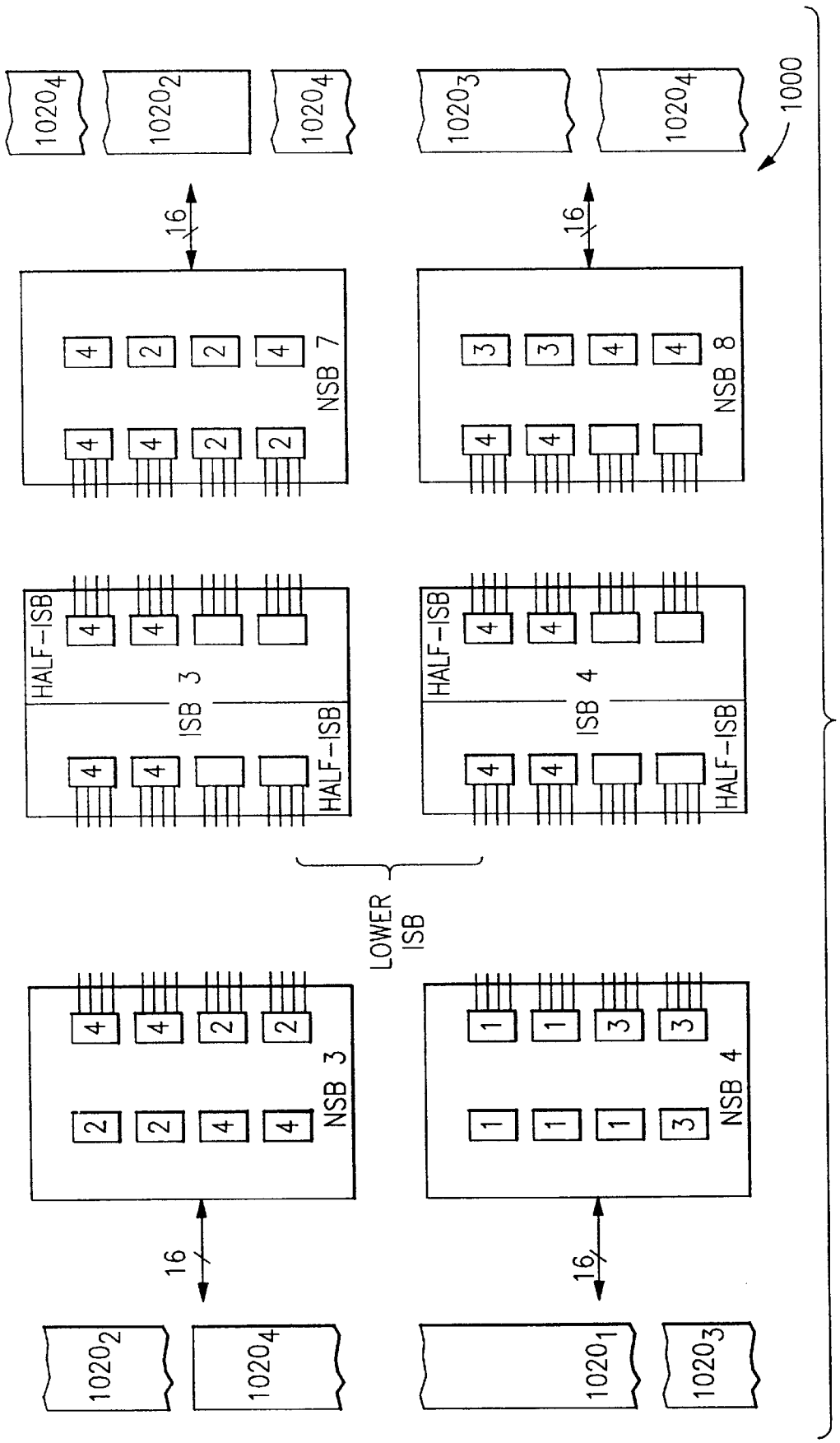

Upon failing to manually interconnect the foregoing partitions, we may seek to simply backtrack and alter certain ISC assignments in an effort to force the system 1000 into a workable set of interconnections. FIG. 11 illustrates such a second attempt. Beginning with the identical switch partition object for node partition 1 as was assigned in our last example, we now assign switches for partition 4. In this example we will choose upper LSC link types and accordingly upper ISC link types in stage one and two for partition 4. Thus, in stage 1, we assign LSC 1 and 2 to NSC 3 and 4 on NSB 3 and assign ISCs 1 and 2 on the first half ISB for ISB 3 and 4 to these LSCs to complete the cross over connection for stage 1 of partition 4. Likewise, we proceed to choose the upper type LSCs for the assignment in stage two of partition 4. Accordingly, the LSC assignments are as follows: LSC 1 and 2 to NSC 2–4 on NSB 6, LSC 1 and 2 to NSC 1 and 4 on NSB 7, and LSC 1 and 2 to NSC 3 and 4 on NSB 8. To complete the cross over connections for stage 2 of partition 4 we assign the aforementioned LSCs to ISC 1 and 2 on the second half ISBs for ISB 3 and 4, thereby completing partition 4.

We next attempt to complete the switch partition object for partition 2. Via reference to FIG. 11 we note that we have previously assigned the upper LSCS for NSB 3 to partition 4, thus we assign lower type LSCs for stage one of partition 2 as follows: NSC 1, 3 and 4 on NSB 2 are assigned to LSC 3 and 4 thereon and NSC 1 and 2 on NSB 3 are assigned to LSC 3 and 4 thereon. Thereafter these LSCs for stage one are assigned to a lower link type set of ISCs in the first half ISCs for the system 1100. Specifically, we assign these LSCs to ISC 3 and 4 on the first half ISBs for the upper type ISBs (ISB 1 and 2). Next we examine the connections for stage two for partition 2. Here we see that NSC 2 and 3 on NSB 7 must be assigned to the lower type LSCs (i.e. LSCs 3 and 4) since LSC 1 an 2 thereon have previously been assigned to partition 4. Thus, we must connect these LSCs to lower link type ISBs on second half ISBs of the now defined upper 2 ISBs (ISB 1 and 2) so as to complete the cross over connection. By reference to FIG. 11 we see that ISC 3 and 4 are available on the second half ISBs for ISB 1 and 2, thus we assign these available ISCs and complete the switch partition object for partition 2.

Finally, we turn to partition 3. Here we note that on NSB 1 NSC 3 and 4 which are part of partition 3 can only take the lower link type LSCs since partition 1 has previously been assigned the upper type LSCs thereon, however on NSB 2 we note that only upper type LSCs are available for NSC 2 from partition 3. We therefore cannot complete the switch partition object for partition 3 and our second manual attempt at partitioning the system 1000 has failed.

From the foregoing it is clear that a systematic approach for allocating the switch resource in a system such as system 1000 having ISBs is requisite and presents further complexities as compared to the foregoing example for the system 800 having no ISBs.

Figure 12B:
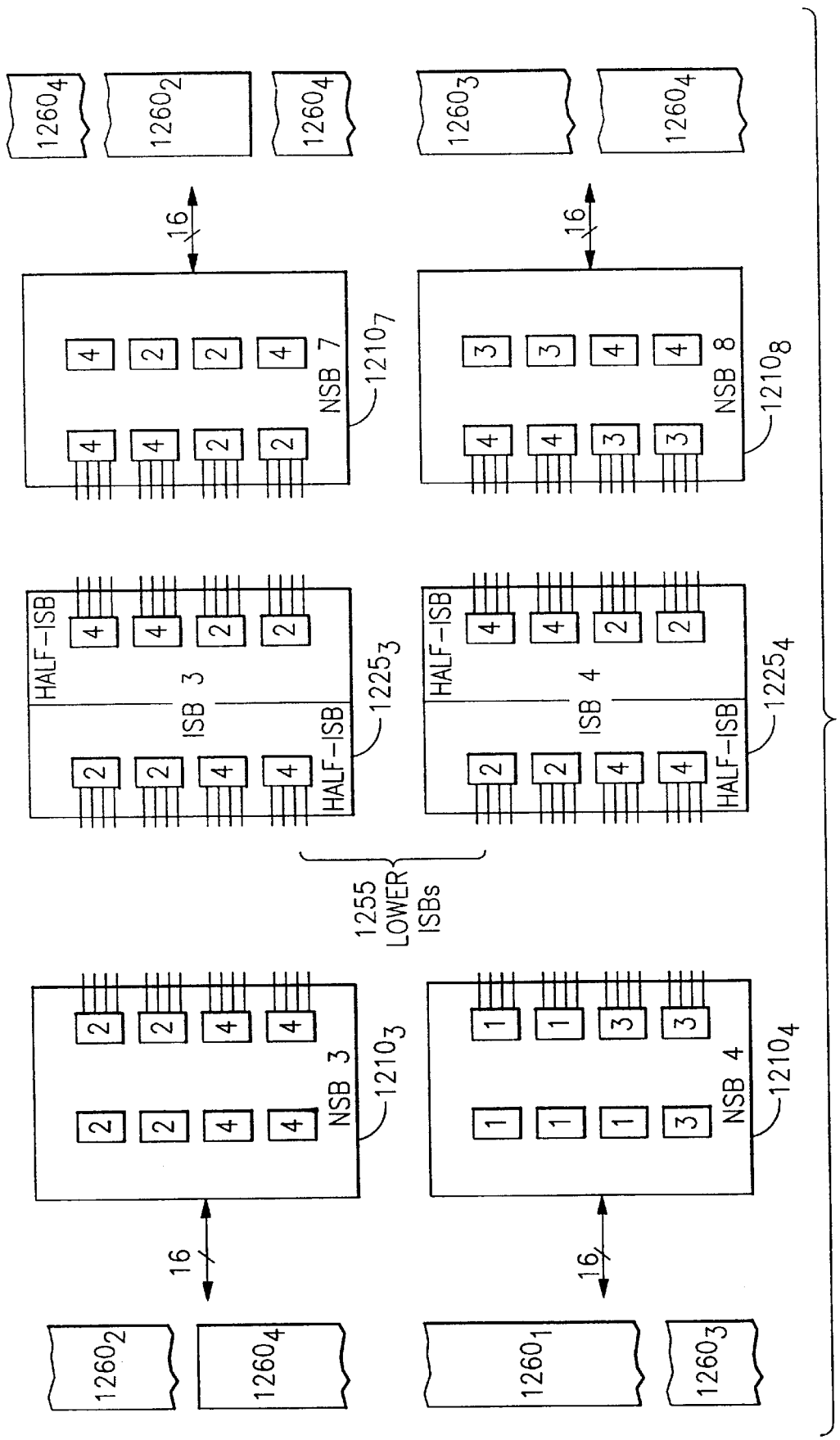

Turning now to the application of the present inventive technique to the one hundred twenty eight node system we will refer to the system 1200 depicted in FIG. 12 which is substantially identical to the system 1000 shown in FIGS. 10 and 11, and will apply the exemplary steps in accordance with the flow diagram 1300 depicted in FIG. 13.

Via reference to the illustration for FIG. 12 it is clear that system 1200 includes eight NSBs ($1210_1$–$1210_8$ referred to as NSB 1–8) each of which includes four NSCs (for example $1215_1$–$1215_4$ referred to as NSC 1–4 for their respective NSB) and four LSCs (for example $1220_1$–$1220_4$ which we will refer to as LSC 1–4 for their respective NSB). Additionally, the system 1200 includes four ISBs $1225_1$–$1225_4$ referred to as ISB 1–4 respectively each including four ISCs in a first ISB half $1230_1$ thereof $1235_1$–$1235_4$ (or ISC 1–4 for the first ISB half of the associated ISB) and four ISCs $1240_1$–$1240_4$ in a second half $1230_2$ of the associated ISB (or ISC 1–4 for the second half ISB of the associated ISB). The system may be viewed as comprising two NSB stages, stage one $1245_1$ includes NSB 1–NSB 4 and stage two $1245_2$ includes NSB 5–NSB 8. The ISBs may further be classified as being ISB types "upper" 1250 which refers to ISB 1 and 2 and "lower" 1255 which refers to ISB 3 and ISB 4.

Within the system 1200 we are seeking to create switch partition objects to correspond to the previously described node partitions 1–4. As we had noted earlier node partition 1 $1260_1$ includes nodes connected to NSC 1 and 2 on NSB 1, NSC 1–3 on NSB 4, and NSC 1–4 on NSB 5. Node partition 2 $1260_2$ includes nodes connected to NSC 1, 3 and 4 on NSB 2, NSC 1 and 2 on NSB 3, and NSC 2 and 3 on NSB 7. Node partition 3 $1260_3$ includes nodes connected to NSC 3 and 4 on NSB 1, NSC 2 on NSB 2, NSC 4 on NSB 4, NSC 1 on NSB 6 and NSC 1 and 2 on NSB 8. Finally, node partition 4 $1260_4$ includes nodes connected to NSC 3 and 4 on NSB 3, NSC 2–4 on NSB 6 NSC 1 and 4 on NSB 7 and NSC 3 and 4 on NSB 8.

In attempting to assign switch partition objects corresponding to the aforementioned node partitions 1–4 in the above described one hundred twenty eight node system 1200, we examine the flow diagram 1300 as depicted in FIG. 13 as represented by the indicated interconnection of FIGS. 13A–13E which will be considered when taken as a whole to represent FIG. 13 depicting flow diagram 1300. The initial steps for flow diagram 1300 match our previous flow diagram 900 represented by FIGS. 9A and 9B for the partitioning of the eighty node system 800. Upon starting the switch partitioning operation 1301 we order the partitions from largest to smallest 1302. In system 1200 the partitions may be ordered as 1 (which comprises nine NSCs) followed by 4 (which comprises nine NSCs as well but will arbitrarily be designated as following partition 1 since partition 1 is connected to the NSCs in earlier occurring NSBs than partition 4) followed by both 2 and 3 (which both include 7 NSCs). Next we determine whether a multi-board partition exists that has not been completed 1303. Referring to FIG. 12 we see that each of the partitions 1–4 are multi-board partitions, none of which have been completed and we thus traverse the "yes" branch of decision box 1303 to step 1304. Alternatively, if we had determined that no multi-board partitions existed that were not complete we would traverse the "no" branch and perform steps 1305–1311 which correspond exactly to the steps 918–917 in FIG. 9 for the eight node processing system 800. As our example will not traverse this branch the reader is referred to the prior description from which the traversal of these steps 1305–1311 within the flow diagram 1300 will be readily appreciated.

Since we have already determined that each of our partitions 1–4 is a multi-board partition, and that none have been completed, we proceed to step 1304 which instructs us to select the largest multi-board partition (partition 1 in our case) and execute a new "cycle" (designated by marker "start cycle") of assignment. By reference to FIG. 13B we see the start of the cycle of assignment indicated by the linking marker "start cycle". Within the execution of the cycle we proceed to decision box 1312 wherein we determine whether there is a multi-board partition which has not yet been completed and which contains another multi-board partition. If we answer the decision box as "no" it would mean that no NSB included NSCs from more than one multi-board partition. If we answer "no" we proceed to step 1313 wherein we mark the link types for the partition (partition 1) as type "all" and assign all of the LSCs on the NSBs for the partition to partition 1 1314. Next we would determine whether ISCs of either link type (we will arbitrarily use "lower") are available on the half ISBs of the lower ISBs 1315. If they are available we assign the lower ISCs to the partition, mark it complete 1316 and proceed to step 1321 (on FIG. 13C) via linking marker A. Alternatively, if these ISCs are not available we assign ISCs of link type "upper" on the half ISBs of ISB type "upper" to the LSCs on the NSBs for the partition 1317 and if the assignment successful we mark the partition complete and proceed to step 1321, but if the ISCs are also not available we cannot complete the partition, thus we signal error and quit.

In our example, NSBs in partition 1 do, in fact, contain other multi-board partitions. By inspection of FIG. 12 it can be seen that partition 1 includes NSB 1 and 4, both of which are also included in partition 3 another multi-board partition. We therefore traverse the "yes" branch of decision box 1312 to step 1318. At step 1318 we mark the partition link type for partition 1 as either upper or lower. For our example we will choose LSCs with link type upper for partition 1 and assign upper type LSCs to the NSCs in partition 1 on all NSBs in partition 1 per step 1319. In our example by reference to FIG. 12 this means that LSC 1 and 2 are assigned to NSC 1 and 2 on NSB 1 and to NSC 1, 2 and 3 on NSB 4 and to NSC 1–4 on NSB 5. At step 1320 we assign ISCs with link type upper on the half ISBs with ISB type upper to the assigned upper link type LSCs from the preceding step for each ISB half. In our case this means we can assign ISC 1 and 2 to the aforementioned LSC 1 and 2 for NSB 1 and 4 on the first half ISB for ISB 1 and 2 and we assign LSC 1 and 2 from NSB 5 to ISC 1 and 2 on the second half ISB for ISB 1 and 2. Since all of these connections are available for assignment, we term switch partition object 1 which corresponds to node partition 1 as being complete and proceed to step 1321. Alternatively, if we did not have adequate ISCs with which to complete the cross over connection we would signal an error and quit.

Figure 13A:
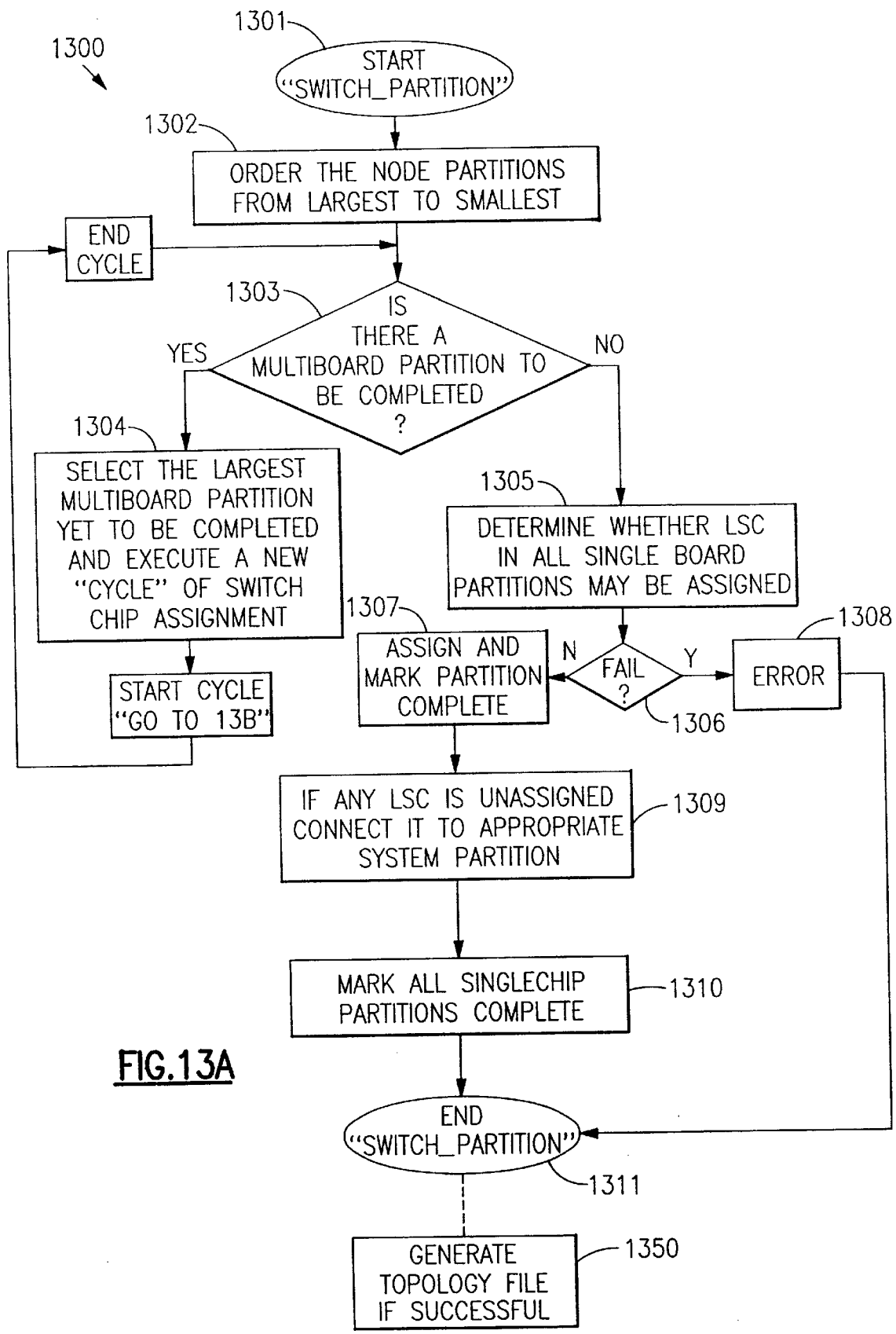
FIGS. 13A, 13B, 13C, 13D and 13E taken together, illustrate a flow diagram representing the sequence of steps for the inventive switch partitioning techniques which are applied to the switch resource partitioning for the illustrated 128 node parallel processing system.
Figure 13B:
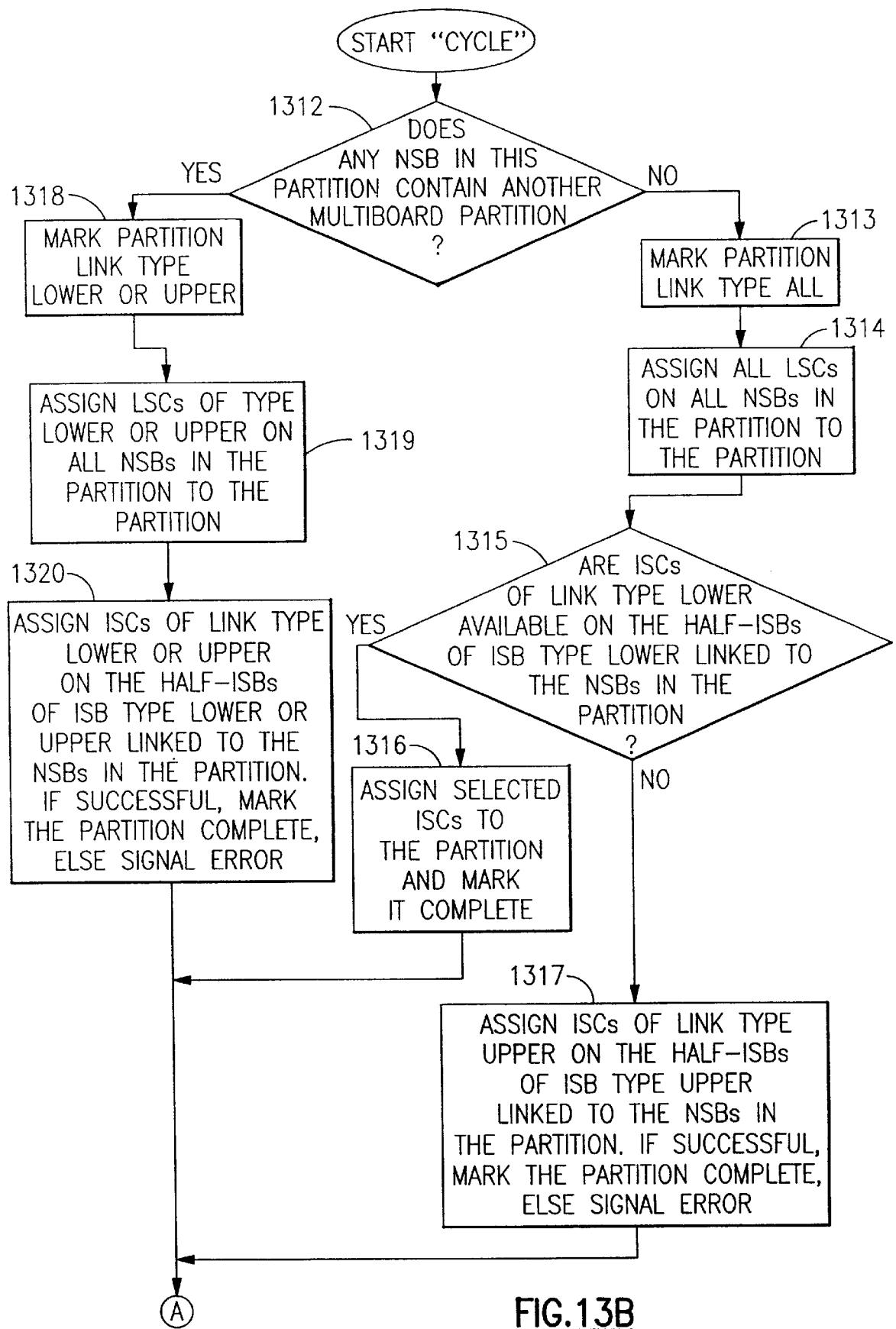
Figure 13C:
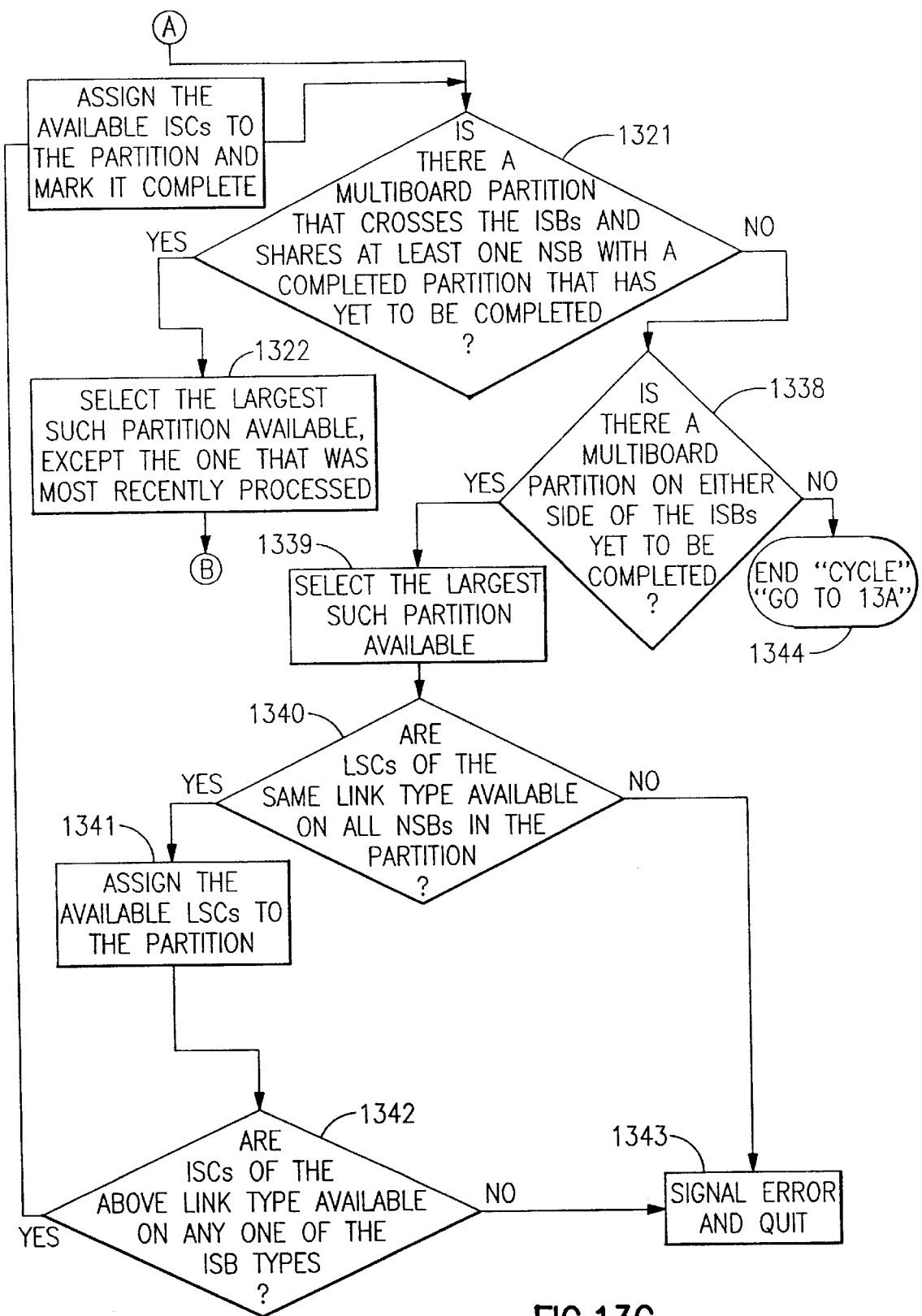

At step 1321, in FIG. 13C, we have completed at least our first partition and we are now asked to determine whether any multi-board partition exists which crosses over the ISBs and which shares an NSB with a completed partition, and which itself has not yet been completed. By inspection we note that partition 1, the only partition to have been completed to this point, shares NSBs with partition 3, and that partition 3 does, in fact, cross over the ISBs (partition 3 includes NSBs 1, 2, 6 and 8). We therefore traverse the "yes" branch to step 1322 wherein we select the largest partition satisfying the conditions imposed in step 1321, which in our case is partition 3, since it is the only partition which satisfies the foregoing conditions. From there we proceed (by way of linking marker B) to FIG. 13D and thereon to decision point 1323.

At 1323 we determine whether partition 3 shares an NSB with a completed partition on both sides of the ISBs. In system 1200, we know that only partition 1 has been completed to this point, and that partition 3 only shares NSBs with partition 1 on stage one of the system (i.e. it does not share NSBs with a completed partition on the right side of the ISBs (or stage 2)). We therefore traverse the "no" branch to decision point 1324 wherein we determine whether LSCs of the same link type are available on NSB which are on the side of the ISBs where the partition shares NSBs with a completed partition. In our example this means we examine whether in stage one of the system 1200 there are LSCs for the same link type available for partition 3. Since partition 1 uses the upper link type LSCs on NSB 1, partition 3 must choose LSC link type lower. By inspection we note that LSC 3 and 4 are available on NSB 1, 2 and 4 and thus we may traverse the "yes" branch from decision point 1324 to step 1325. Alternatively, if we could not find LSCs of the same link type for the partition, it could not be completed and we would signal an error and quit the procedure 1326.

At step 1325 we assign the lower type LSCs to partition 3 on the stage one side of the system as follows: LSC 3 and 4 are assigned to NSC 3 and 4 on NSB 1, to NSC 2 on NSB 2, to NSC 4 on NSB 4. At decision point 1325a we determine whether ISCs of the previously assigned lower link type are available to the LSCs for partition 3 on the previously allocated ISB type (ISB type upper for partition 1) on both sides of the ISBs. This means we need to determine whether ISC 3 and 4 (lower link type ISCs) are available on the first and second half ISBS for ISB 1 and 2 (upper ISB type). By inspection of FIG. 12 we can see that the ISCs are available and accordingly we traverse the "yes" branch to step 1327 wherein we assign ISC 3 and 4 on both the first and second half ISBs for ISB 1 and 2 to partition 3. Next in step 1328 we assign LSCs of link type lower to NSCs which have not yet been assigned to the partition. In our case these are the LSCs in stage 2 of the system 1200 and we assign them to partition 3 as follows: LSC 3 and 4 are assigned to NSC 1 on NSB 6 and to NSC 1 and 2 on NSB 8. Upon accomplishing these assignments partition 3 is considered complete and control loops back (via linking marker A) to decision point 1321 (on FIG. 13C).

At decision point 1321 we determine once again whether a multi-board partition which crosses the ISBs and shares at least one NSB with a previously completed partition, but which itself has not been completed still exists. By inspection of the system, we note that both partition 2 and partition 4 satisfy all of the foregoing partitions, and we therefore traverse the "yes" branch to step 1322. At step 1322 we select the largest partition satisfying the previous conditions except where that partition was the partition most recently processed. Neither of the partitions 2 or 4 have been processed yet, and since partition 4 is larger than partition 2 we select partition 4 and proceed (via link marker B) to decision point 1323 (on FIG. 13D).

At decision point 1323 we determine whether partition 4 shares an NSB with a completed partition on both sides of the ISBs. By inspection of FIG. 12 we can see that partition 4 shares NSBs with completed partition 3, but only on the left side of the ISBs. We therefore traverse the "no" branch to decision point 1324 wherein we determine whether LSCs of the same type are available on NSBs on the ISB side on which the partition shares NSBs with a completed partition. In our example, since partition 3 uses link type lower LSCs on NSBs 6 and 8 which are shared with partition 4, we can readily determine that LSCs 1 and 2 are available to partition 4 on NSB 6 and 8. We therefore traverse the "yes" branch to step 1325 wherein we assign the LSCs on the ISB side that shares an NSB with a completed partition as follows: LSC 1 and 2 to NSC 2–4 on NSB 6 and to NSC 3 and 4 on NSB 8.

At decision point 1325a we determine whether ISCs of the previously assigned "upper" link type (ISCs 1 and 2) are available on a previously allocated ISB type (in our case upper ISBs or ISBs 1 and 2) on both the first and second half ISBs. By inspection it is readily apparent that ISBs 1 and 2 have been fully assigned with our previous assignment of partitions 1 and 3 and as such there is no previously allocated ISB type available. We therefore traverse the "no" branch to step 1329, wherein we determine whether ISCs of the required type (in our case ISCs 1 and 2 or upper type ISCs) available on any of the ISB types (i.e. on both ISB 1 and 2 or on both ISB 3 and 4) on the ISB side adjacent to the side in which the partition shares an NSB with a completed partition (in our case the second half ISB side) and whether both ISC types are available on the other ISB side. In our example we note that ISB 3 and 4 have upper type ISCs available on the second ISB half thereof and that both ISC types are available on the first half ISB for ISB 3 and 4. We therefore traverse the "yes" branch to step 1330 wherein we assign the ISCs on the shared side of the ISBs to the partition and note that the partition has not been fully completed by designating it as "partial". Thereafter we loop back (via link marker A) to decision point 1321 (in FIG. 13C). In our example this assignment is made as follows: ISC 1 and 2 on the second ISB halves of ISB 3 and 4 are assigned to LSC 1 and 2 for NSB 6 and 8.

At decision point 1321 we once again determine whether a multi-board partition which cross over the ISBs and which shares at least one NSB with a completed partition, but which itself is not yet complete exists. As in the previous case both partitions 2 and 4 satisfy each of these conditions. We therefore traverse the "yes" branch to step 1322 wherein we select the largest of the partitions that satisfies these conditions which has not been most recently processed. You will recall that our last processing loop involved the "partial" assignment of partition 4. Accordingly, we cannot select partition 4 in step 1322 and we are left with partition 2 which is selected and control passes (via linking marker B) to decision point 1323 (on FIG. 13D).

At decision point 1323 we determine whether partition 2 shares an NSB with a completed partition on both sides of the ISBs. In our exemplary system 1200, we see that on the left side of the ISBs partition 2 shares NSB 2 with completed partition 3 but that on the right side of the ISBs partition 2 only shares NSBs (specifically NSB 6 and 8) with partition 4 which is partially complete. We therefore traverse the "no" branch again to decision point 1324, wherein we determine whether LSCs of the same link type are available on NSBs on the ISB side of the partition which shares NSBs with the completed partition. In our example, we see that in stage one of the system 1200, partition 3 is assigned LSCs 3 and 4 on NSB 2, thus partition 2 must use the upper link type LSCs on this ISB side. We further note that since the LSCs for partition 4 have not yet been assigned for NSB 3, we have the upper type LSCs (i.e. LSCs 1 and 2) available to partition 2 on NSB 3 as well. We therefore traverse the "yes" branch and assign LSC 1 and 2 on NSB 2 and 3 to partition 3 as follows 1325: LSC 1 and 2 are assigned to NSC 1, 3 and 4 on NSB 2 and to NSC 1 and 2 on NSB 3.

We next proceed to decision point 1325a wherein we determine whether ISCs of the above-determined link type (upper) are available on a previously allocated ISB type on both sides. In our example we look to ISB type lower (ISB 3 and 4) as they contain the only unassigned ISCS. We note that upper link type ISCs are available on the first half ISB for ISB 3 and 4 but that ISC 1 and 2 on the second half ISB for ISB 3 and 4 has previously been assigned to partition 4. We therefore traverse the "no" branch to decision point 1329 wherein we determine whether ISCs of the desired link type (upper) are available on the ISB side wherein the partition shares an NSB with a completed partition (i.e. the left ISB side or first half ISB side) and also whether both ISC types are available on the other ISB side. Since we have already noted that ISC 1 and 2 for the second half ISB for ISB 3 and 4 has already been assigned to partially complete partition 4, we traverse the "no" branch (via linking marker C) to decision point 1331 (on FIG. 13E).

At decision point 1331 we determine whether ISCs of the desired link type (upper), are available on the side of the ISB on which the partition shares an NSB with a completed partition and whether any ISC link type is available on the other side of the ISBS. In our example we have previously determined that upper type ISCs are available on the first half ISBs for ISB 3 and 4. By examination of FIG. 12 it is also clear that ISC 3 and 4 are available on the second half ISBs for ISB 3 and 4. We therefore traverse the "yes" branch and proceed to step 1332. Alternatively, if we did not have sufficient ISCs available, the cross over connection for the partition could not be established and we would signal an error and quit 1333. In step 1332 we assign the available ISCs (and LSCs) to complete partition 2 as follows: ISC 1 and 2 on the first half ISB for ISB 3 and 4 are assigned to LSC 1 and 2 on NSB 2 and 3 and ISC 3 and 4 on the second half ISB for ISB 3 and 4 are assigned to LSC 3 and 4 on NSB 7. By inspecting the completed assignments for partition 2 it can be seen that the ISC type changes from upper on the first ISB half to lower on the second ISB half for ISBs 3 and 4. As we had previously noted, the cross over of link types within an ISB is permissible and thus partition 2 is completed. Upon completion of step 1332 we proceed (via link marker A) back to decision point 1321 (on FIG. 13C).

Figure 13D:
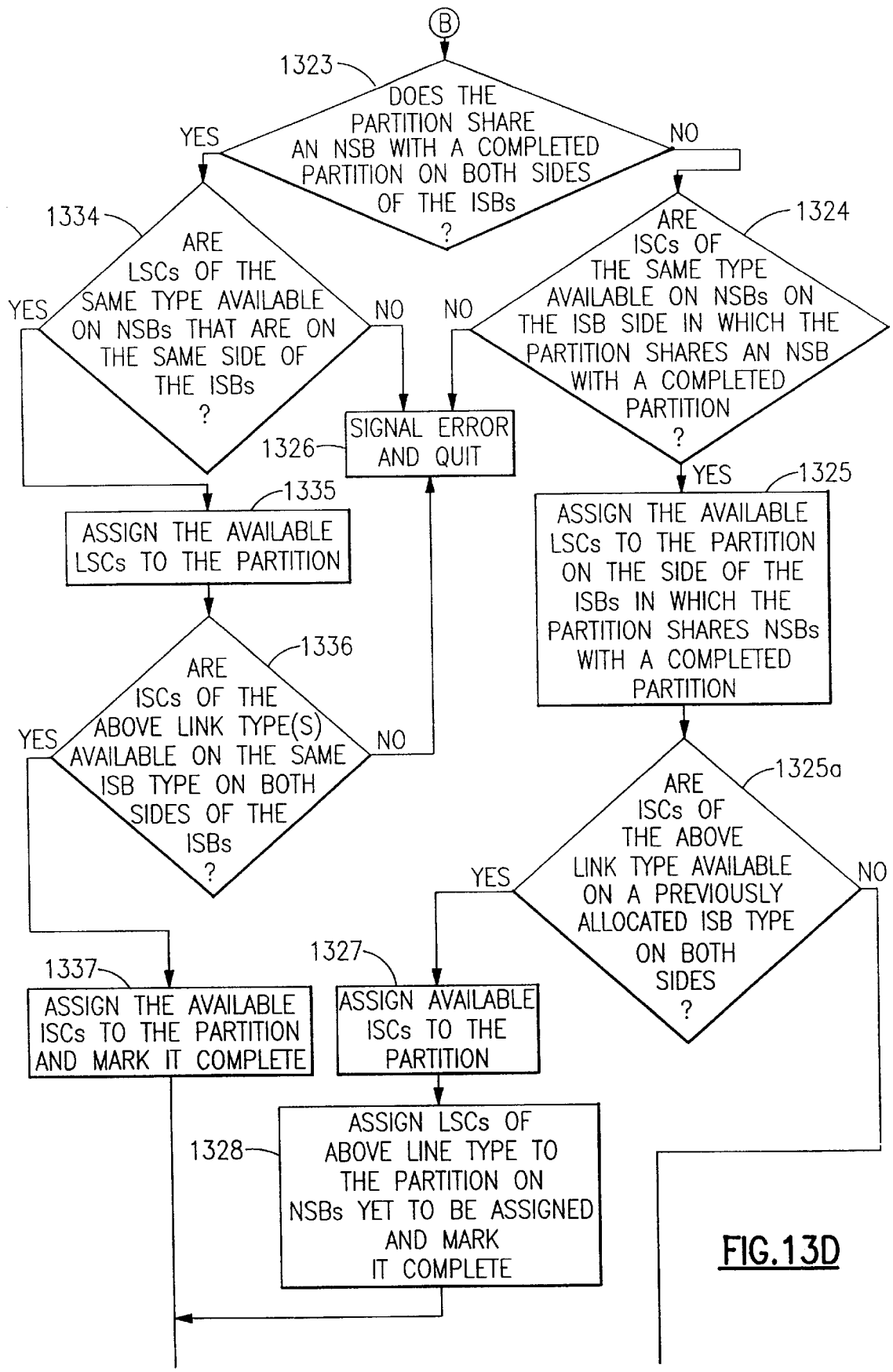
Figure 13E:
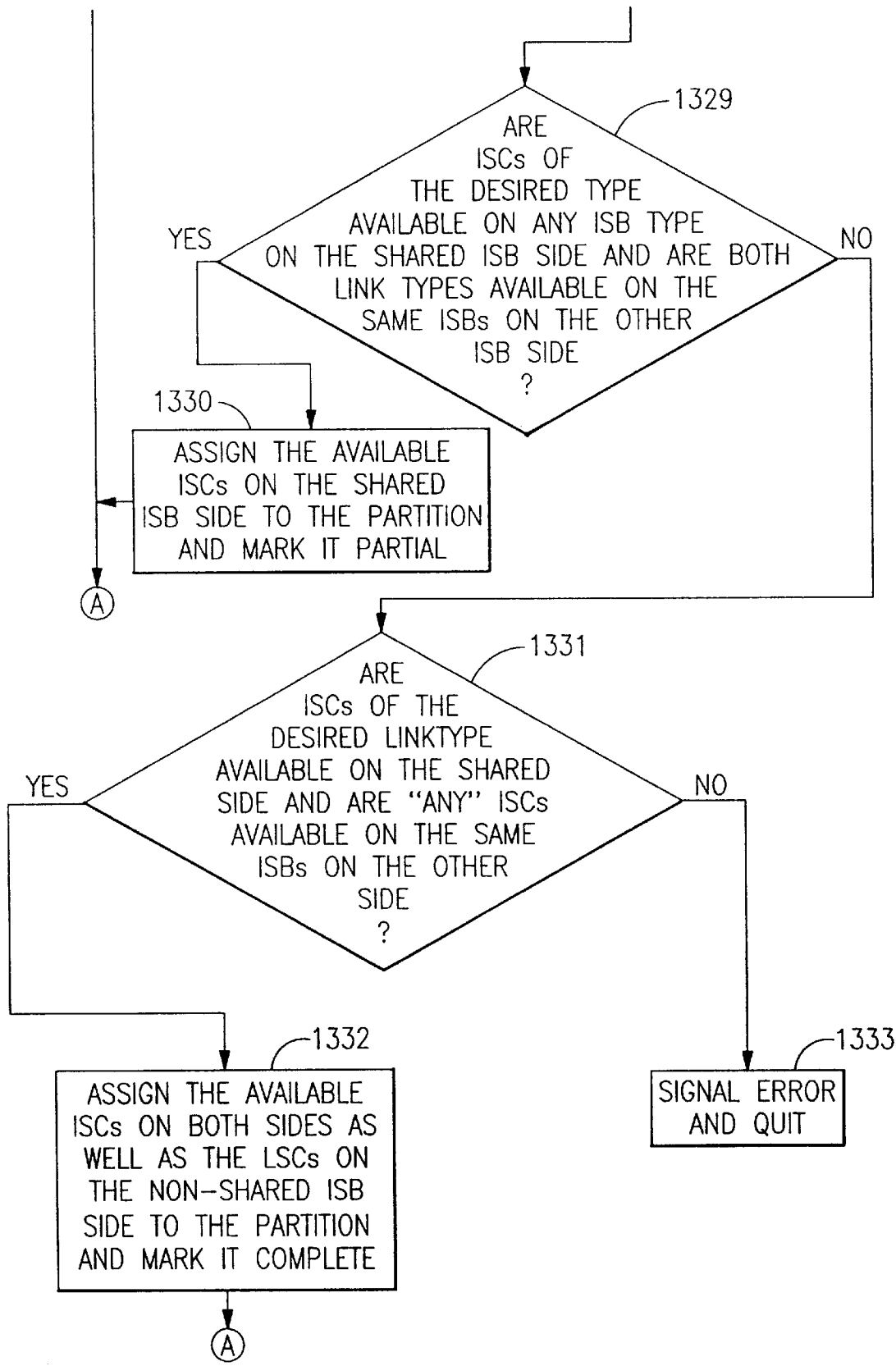

At decision point 1321 we note that partition 4 satisfies each of the previously specified conditions and in step 1322 we select partition 4 and proceed to decision point 1323 (on FIG. 13D). At decision point 1323 we note that partition 4 shares and NSB with completed partitions on both sides of the ISBs (it shares NSB 6 and 8 with completed partition 3 and NSB 7 with completed partition 2 on one side and shares NSB 3 with completed partition 2 on the other ISB side). We therefore traverse the "yes" branch to decision point 1334 wherein we determine whether LSCs of the same link type are available on the NSBs for the partition which are on the same side of the ISBs. In our case we can see that we must use the lower type LSCs in NSB 3 on stage one since partition 2 has been assigned the upper LSCs thereon and we can see that we have the upper type LSCs available in stage 2 since partition 3 has been assigned the lower type LSCs on NSB 6 and 8 and partition 2 has been assigned the lower type LSCs on NSB 7. We therefore traverse the "yes" branch to step 1335. If, on the other hand we determined that inadequate LSC types were available on either ISB side, the partition could not be completed, and we would signal an error and quit 1326.

At step 1335 we assign the available LSCs to partition 4 as follows: LSC 3 and 4 are assigned to NSC 3 and 4 on NSB 3, LSC 1 and 2 are assigned to NSC 2–4 on NSB 6, to NSC 1 and 4 on NSB 7 and to NSC 3 and 4 on NSB 8. Next, at decision point 1336, we determine whether ISCs of the previously determined link types are available on the corresponding ISB sides. If not, the cross over portion of the partition cannot be completed and we signal an error and quit 1326. In our case we note that the required lower type ISCs (ISC 3 and 4) are available on the first half ISB for ISB 3 and 4 and that the required upper type ISCs (ISC 1 and 2) are available on the second half ISB for ISB 3 and 4. We therefore traverse the "yes" branch and the available ISCs to the partition as follows: ISC 3 and 4 on the first half ISB for ISB 3 and 4 are assigned to LSC 3 and 4 on NSB 3, and ISC 1 and 2 on the second half ISB for ISB 3 and 4 are assigned to LSC 1 and 2 for NSB 6, 7 and 8. Thereafter partition 4 is termed complete and we loop control (via link marker A) back to decision point 1321 (on FIG. 13C).

At decision point 1321 we now determine that no partition have yet to be completed and we traverse the "no" branch to decision point. At 1338 we determine whether a multi-board partition on either ISB side has yet to be completed. If the answer is "yes" we proceed to execute steps 1339–1343 wherein we select the largest available partition and determine whether there are adequate LSCs of the same link type available to assign to the partition. If there is not we signal an error and quit, but if there are sufficient LSCs we assign them to the partition and determine whether there is a sufficient number of the same link type ISCs are available. If there are not, an error is signalled and we quit the procedure, however if there is sufficient ISC resource it is assigned, the partition is completed and control loops back (via link marker A) to decision point 1321 until we have completed the last multi-board partition.

In our case, since we have previously determined that no multi-board partitions have yet to be completed, we traverse the "no" branch of decision point 1338 to step-1344 in which the cycle of assignment is ended and control reverts back to decision point 1303 (FIG. 13A) in which we determine that no multi-board partitions have not been completed. Thereafter we proceed through previously examined steps 1305–1311 to end the switch partition procedure. Since our example included no single-board or single chip partitions and since the partitioning did not leave any unassigned LSCs, steps 1305–1311 result in no further chip assignments.

With the foregoing example we have illustrated in exhaustive detail, the steps required to successfully partition the interconnection resource in a relatively large massively parallel processing system. Without loss of generality, this inventive technique may be applied to such systems to facilitate the allocation of the switching resource among partitions of processing nodes. It should be noted that such an implementation would preferably be accomplished via a computer program running on a work station which, when provided with the sets of processing node partitions and the ordering of the switching network as input, generates a topology file 1350 for enabling and disabling physical connections within the massively parallel processing system so as to generate the corresponding switch partition objects. By implementing the foregoing inventive techniques in a software embodiment it has been possible to generate a number of different topology files for partitioning the switch network of a 128 node IBM RS/6000 SP2 massively parallel processing system.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention defined in the following claims, which should be construed so as to maintain the proper protection for the invention first disclosed.

Having thus described our invention in detail, what we claim as new and desire to protect via Letters Patent is as follows:

1. A program storage device readable by a machine, tangibly embodying a program of instructions executable by the machine to perform the method steps for partitioning of an interconnection medium, the interconnection medium for providing interconnections between nodes in a plurality of disjoint sets of nodes, wherein the interconnection medium comprises a plurality of groups and one or more intermediate groups, the intermediate groups being interposed between a first stage of the groups comprising a subset of the plurality of groups and a second stage of groups comprising a remainder of the plurality of groups, each of said groups including one or more node coupling elements and one or more link coupling elements, and each of the intermediate groups including a plurality of intermediate coupling elements, the node coupling elements each coupled to one or more of the nodes and capable of being coupled within each of the groups to the link coupling elements, each of the link coupling elements capable of being coupled to one or more of the plurality of intermediate coupling elements in the intermediate groups, each of the intermediate coupling elements capable of being coupled within each of the intermediate groups to others of said intermediate coupling elements therein to interconnect the node coupling elements in different groups, and wherein a partition is defined by exclusively assigning one or more of the node coupling elements, and the link coupling elements and the intermediate coupling elements required to interconnect the assigned node coupling elements, to one of the disjoint sets of nodes to permit the interconnection of the nodes therein and to isolate the nodes therein from the nodes in any other of the disjoint sets of nodes, the method steps comprising:

(a) defining a partition interconnecting a largest unconnected disjoint set of the nodes;

(b) if any group having a node coupling element in any of the defined partitions includes another node coupling element coupled to an unconnected set of nodes, defining a new partition interconnecting the largest unconnected disjoint set of nodes to which said other node coupling element in such a group is coupled, wherein the new partition includes one or more node coupling elements included in the first stage of groups and one or more node coupling elements included in the second stage of groups;

(c) repeating step b until no group having a node coupling element included in any of the defined partitions also includes a node coupling element coupled to an unconnected disjoint set of nodes; and (d) repeating steps a–c until there are no remaining unconnected disjoint sets of nodes.

2. A program storage device according to claim 1 wherein each of the link coupling elements has a link type and wherein within each of the groups, the node coupling elements which are included in the same defined partition may only be coupled to said link coupling elements having the same link type.

3. A program storage device according to claim 2 wherein each of the intermediate coupling elements has the link type and wherein the link coupling elements in the first stage may be coupled to one or more of the intermediate coupling elements having the same link type on a first side of the intermediate groups, and wherein the link coupling elements in the second stage may be coupled to one or more of the intermediate coupling elements having the same link type on a second side of the intermediate groups, and wherein each of the intermediate groups has a group type, each of the link coupling elements within each of the defined partitions coupling to the intermediate coupling elements in intermediate groups having the same group type.

4. A program storage device according to claim 3 wherein if in method step b the largest unconnected disjoint set of nodes is coupled to node coupling elements included in groups in only one of the first stage and the second stage which also include node coupling elements in any of the defined partitions, then method step b further includes the steps of:

(b.1) assigning the link coupling elements required to interconnect the node coupling elements in the groups in said only one of the first stage and the second stage which are coupled to the largest unconnected disjoint set of nodes;

(b.2) if said intermediate coupling elements having the same link type as the assigned link coupling elements are available on both said first side and said second side of one or more of the intermediate groups having a group type which is the same as an intermediate group including an intermediate coupling element which is part of any of the defined partitions, assigning the intermediate coupling elements on said first side and said second side required to interconnect the link coupling elements in said first stage and said second stage to the node coupling elements coupled to the largest unconnected disjoint set of nodes; and (b.3) assigning the link coupling elements in groups in the other one of said only one stages required to interconnect the node coupling elements coupled to the nodes in the largest unconnected disjoint set of nodes.

5. A program storage device according to claim 3 wherein if in method step b the largest unconnected disjoint set of nodes is coupled to node coupling elements included in groups in only one of the first stage and the second stage which also include node coupling elements in any of the defined partitions, then method step b further includes the steps of:

(b.1) assigning the link coupling elements required to interconnect the node coupling elements in said only one of the first stage and the second stage which are coupled to the largest unconnected disjoint set of nodes;

(b.2) if said intermediate coupling elements having the same link type as the assigned link coupling elements of step b.1 on one of the first and second sides of one or more intermediate groups are available to couple to the assigned link coupling elements of step b.1 and if all of said intermediate coupling elements on the other one of said first and second sides in at least one of the one or more intermediate groups are available to couple to the node coupling elements coupled to the largest unconnected disjoint set of nodes, assigning the intermediate coupling elements to be coupled to the assigned link coupling elements of step b.1 creating a partially defined partition; and wherein when step b is next repeated in step c the partially defined partition is excluded from the defining in step b.

6. A program storage device according to claim 3 wherein if in method step b the largest unconnected disjoint set of nodes is coupled to node coupling elements included in groups in only one of the first stage and the second stage which also include node coupling elements in any of the defined partitions, then method step b further includes the steps of:

(b.1) assigning the link coupling elements required to interconnect the node coupling elements in said only one of the first stage and the second stage which are coupled to the largest unconnected disjoint set of nodes;

(b.2) if said intermediate coupling elements having the same link type as the assigned link coupling elements of step b.1 on one of the first and second sides of one or more intermediate groups to are available to couple to the assigned link coupling elements of step b.1 and if any of said intermediate coupling elements on the other one of said first and second sides in at least one of the one or more intermediate groups are available to couple to the node coupling elements coupled to the largest unconnected disjoint set of nodes, assigning the intermediate coupling elements to be coupled to the link coupling elements in both the first and second stages; and (b.3) assigning the link coupling elements in the groups in the other one of said only one stages required to interconnect the node coupling elements coupled to the nodes in the largest unconnected disjoint set of nodes.

7. A program storage device according to claim 3 wherein if in method step b the largest unconnected disjoint set of nodes is coupled to node coupling elements included in groups in both the first stage and the second stage which also include node coupling elements in any of the defined partitions, then method step b further includes the steps of:

(b.1) separately within each of the first stage and the second stage, if said link coupling elements having the same link type are available to interconnect the node coupling elements coupled to the nodes of the largest unconnected disjoint set of nodes, assigning the link coupling elements having the same link type separately within the first stage and within the second stage to the largest unconnected disjoint set of nodes; and (b.2) if said intermediate coupling elements having the same link types as the assigned link coupling elements of step b.1 are available on one or more intermediate groups having the same group type, assigning the intermediate coupling elements thereon having the same link types as the assigned link coupling elements of step b.1 to the largest unconnected disjoint set of nodes.

8. A program storage device according to claim 3 wherein if in method step b, the new partition to be defined includes only node coupling elements, coupled to the largest unconnected disjoint set of nodes in one of said first stage and said second stage of groups, the method step b further includes the steps of:

(b.1) assigning said link coupling elements each having the same link type to be coupled to the node coupling elements coupled to the largest unconnected disjoint set of nodes; and (b.2) assigning said intermediate coupling elements each having the same link type as said assigned link coupling elements of step b.1 to be coupled to the assigned link coupling elements of step b.1 on one or more intermediate groups having the same group type.

9. A program storage device according to claim 1 wherein if the defining of a partition includes assigning node coupling elements from different groups, the defined partition is a multi-group partition.

10. A program storage device according to claim 9 wherein the defining of the partition in method step a is performed by assigning the intermediate coupling elements and the link coupling elements and the node coupling elements to the largest unconnected disjoint set of nodes which requires one of said multi-group partitions to interconnect the nodes therein.

11. A program storage device according to claim 10 wherein if the defining of a partition includes assigning node coupling elements and link coupling elements which are all from the same group, the defined partition is a single-group partition.

12. A program storage device according to claim 11 wherein if in the defining of the partition in method step a the assignment of the node coupling elements and the link coupling elements to each of the unconnected disjoint sets of nodes fails to define at least one multi-group partition, then the defining of the partition is performed on the largest unconnected disjoint set of nodes which defines one of said single-group partitions.

13. A program storage device according to claim 12 wherein if the defining of a partition includes only assigning a single node coupling element, the defined partition is a single-element partition.

14. A program storage device according to claim 13 wherein if in the defining of the partition in method step a the assignment of the node coupling elements to each of the unconnected disjoint sets of nodes fails to define at least one multi-group partition and at least one single-group partition, then the defining of the partition is performed on the largest unconnected disjoint set of nodes which defines one of said single-element partitions.

15. A program storage device according to claim 1 wherein if an insufficient number of the link coupling elements or the intermediate coupling elements are available to define a partition in method step a, an error is signalled.

16. A program storage device according to claim 1 wherein if an insufficient number of the link coupling elements or the intermediate coupling elements are available to define a partition in method step b, an error is signalled.

17. A program storage device according to claim 1, wherein the method steps further include the step of:

(e) generating a topology file including the defined partitions, said topology file for interconnecting the disjoint sets of processing nodes in a parallel processing system.

18. A program storage device according to claim 1 wherein each of the nodes within the disjoint sets of nodes includes a processor.

19. A program storage device according to claim 18 wherein the processor is a RISC processor.

20. A program storage device according to claim 1 wherein the node coupling elements and the link coupling elements each include one or more switches.

21. A program storage device according to claim 20 wherein the one or more switches are multi-port, bi-directional, cross-point switches.

* * * * *